(12) United States Patent
Tseng et al.

(10) Patent No.: US 12,079,521 B2
(45) Date of Patent: *Sep. 3, 2024

(54) DIRECT MEMORY ACCESS DATA PATH FOR RAID STORAGE

(71) Applicant: GRAID Technology Inc., Santa Clara, CA (US)

(72) Inventors: Guo-Fu Tseng, New Taipei (TW); Tsung-Lin Yu, Luodong (TW); Cheng-Yue Chang, New Taipei (TW)

(73) Assignee: GRAID Technology Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/174,487

(22) Filed: Feb. 24, 2023

(65) Prior Publication Data
US 2023/0221899 A1  Jul. 13, 2023

Related U.S. Application Data

(63) Continuation of application No. 17/486,643, filed on Sep. 27, 2021, now Pat. No. 11,662,955.

(51) Int. Cl.
*G06F 3/06* (2006.01)
*G06F 11/10* (2006.01)
*G06F 15/173* (2006.01)

(52) U.S. Cl.
CPC .......... *G06F 3/0689* (2013.01); *G06F 3/0619* (2013.01); *G06F 3/0659* (2013.01); *G06F 11/1076* (2013.01); *G06F 15/17331* (2013.01)

(58) Field of Classification Search
None
See application file for complete search history.

(56) References Cited

U.S. PATENT DOCUMENTS

| 6,161,165 A | 12/2000 | Solomon |
| 7,546,483 B1 | 6/2009 | Overby |

(Continued)

FOREIGN PATENT DOCUMENTS

| CN | 110231914 | 9/2019 |
| TW | 202018505 | 5/2020 |

(Continued)

OTHER PUBLICATIONS

Unknown, "NVMe RAID| Microsemi" website, 2020. Access on Sep. 24, 2021 at https://www.microsemi.com/product-directory/upcoming-technology/5454-nvme-raid.

*Primary Examiner* — Kaushikkumar M Patel
(74) *Attorney, Agent, or Firm* — Van Pelt, Yi & James LLP

(57) ABSTRACT

Direct memory access data path for RAID storage is disclosed, including: receiving, at a Redundant Array of Independent Disks (RAID) controller, a request to write data to be distributed among a plurality of storage devices; computing parity information based at least in part on the data associated with the request; causing the parity information to be stored on a first subset of the plurality of storage devices; and causing the data associated with the request to be stored on a second subset of the plurality of storage devices, wherein the plurality of storage devices is configured to obtain the data associated with the request directly from a memory that is remote to the RAID controller, and wherein the data associated with the request does not pass through the RAID controller.

14 Claims, 14 Drawing Sheets

(56) References Cited

U.S. PATENT DOCUMENTS

| | | | |
|---|---|---|---|
| 9,336,173 B1 * | 5/2016 | Sodke | G06F 3/0665 |
| 9,952,991 B1 | 4/2018 | Bruce | |
| 10,489,318 B1 | 11/2019 | Bruce | |
| 2006/0294416 A1 | 12/2006 | Tsai | |
| 2008/0313397 A1 | 12/2008 | Millman | |
| 2009/0240873 A1 | 9/2009 | Yu | |
| 2016/0110255 A1 | 4/2016 | Yun | |
| 2018/0341547 A1 | 11/2018 | Bolkhovitin | |
| 2019/0034306 A1 * | 1/2019 | Wysocki | G06F 11/2094 |
| 2020/0004701 A1 | 1/2020 | Subbarao | |
| 2020/0218617 A1 | 7/2020 | Knestele | |
| 2021/0182219 A1 * | 6/2021 | Benisty | G06F 13/4282 |
| 2021/0373786 A1 | 12/2021 | Glimcher | |

FOREIGN PATENT DOCUMENTS

| | | |
|---|---|---|
| WO | 2008070173 | 6/2008 |
| WO | 2018217273 | 11/2018 |

\* cited by examiner

DIRECT MEMORY ACCESS DATA PATH FOR RAID STORAGE

CROSS REFERENCE TO OTHER APPLICATIONS

This application is a continuation of U.S. patent application Ser. No. 17/486,643, entitled DIRECT MEMORY ACCESS DATA PATH FOR RAID STORAGE filed Sep. 27, 2021 which is incorporated herein by reference for all purposes.

BACKGROUND OF THE INVENTION

Redundant Array of Independent Disks (RAID) storage stores data across a group of disk drives to improve data redundancy and performance. However, some conventional techniques for implementing RAID algorithms result in inefficiencies. In a first example where a hardware RAID controller is used to implement a RAID algorithm (e.g., implementing a RAID algorithm may involve computing a checksum based on data to be written to the storage disk drives), the hardware RAID controller becomes a bottleneck, especially while processing write operations, because the RAID controller needs to obtain the data that is to be written, generate a checksum based on the data that is to be written, and store the data that is to be written along with the checksum at the disk drives of the RAID group. In a second example where the host (e.g., a CPU) is implementing a RAID algorithm using software, significant computational resources of the CPU can be devoted to implement the tasks associated with the RAID algorithm, thereby limiting the amount of resources of the CPU that can be used to implement the numerous other types of requests that are received at the CPU. As such, it is desirable to implement RAID techniques for a RAID group of disk drives in a more efficient manner.

BRIEF DESCRIPTION OF THE DRAWINGS

Various embodiments of the invention are disclosed in the following detailed description and the accompanying drawings.

DETAILED DESCRIPTION

Figure 1:
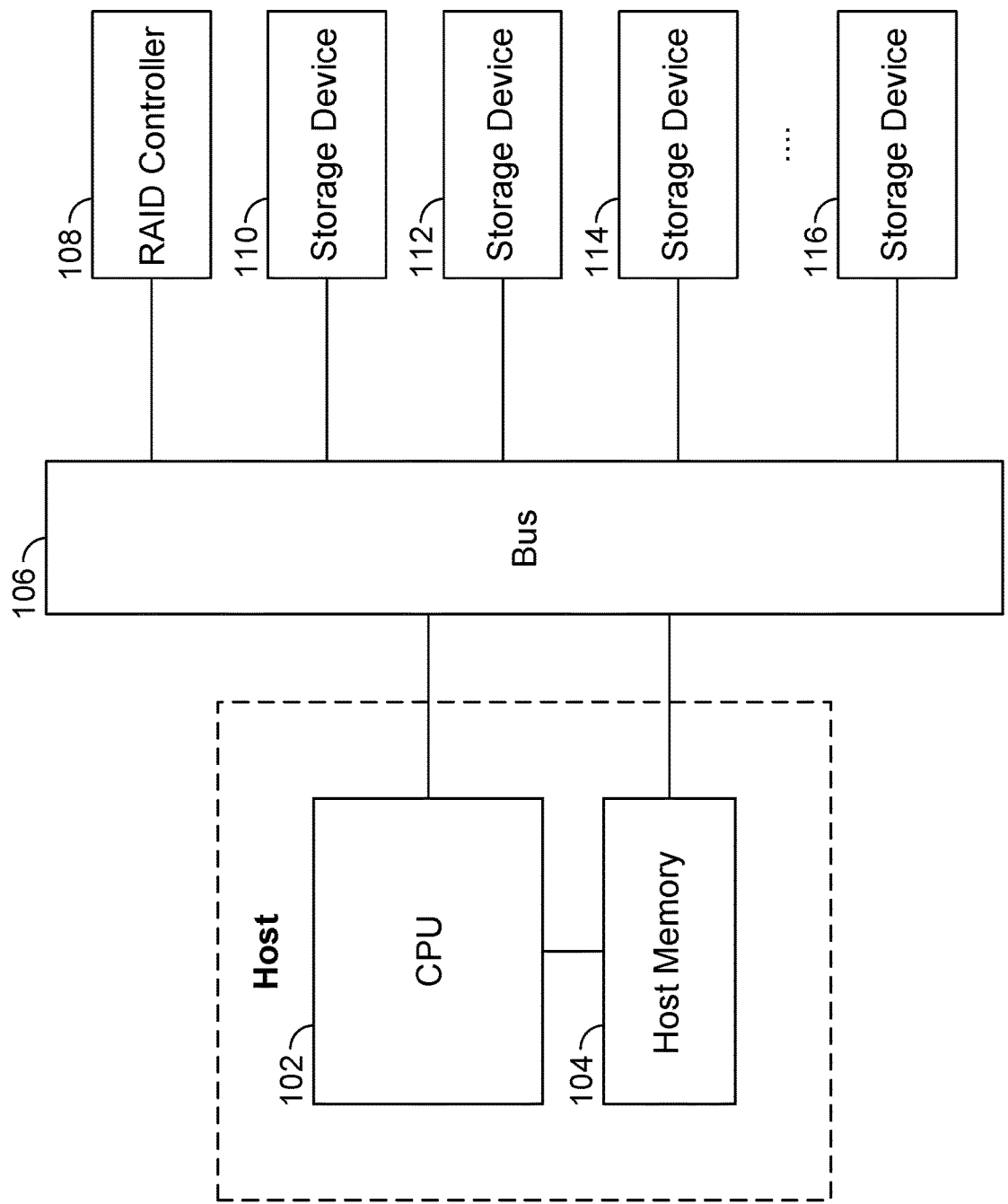
FIG. 1 is a diagram showing an embodiment of a system for implementing a direct memory access (DMA) data path for RAID storage.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of implementing a direct memory access (DMA) data path for RAID storage are described herein. A request to write data to be distributed among a plurality of storage devices is received at a RAID controller. In various embodiments, the request is received from a host (e.g., a central processing unit (CPU)). In various embodiments, the RAID controller is implemented using a graphics processing unit (GPU). In various embodiments, the plurality of storage devices comprises a RAID group of storage devices. In various embodiments, each storage device is a solid-state drive (SSD) that uses a nonvolatile memory express (NVMe) communication transfer protocol to communicate with other components. In various embodiments, each SSD communicates with other components over a Peripheral Component Interconnect Express (PCIe) bus. In various embodiments, in response to receiving the request to write the data to the RAID storage device group, the RAID controller is configured to read the data that is requested to be written from a memory associated with the host (this memory is sometimes referred to as a "host memory") using direct memory access (DMA). In various embodiments, "direct memory access" refers to a component accessing the host memory independently of the host. For example, the RAID controller can obtain the to-be-written data from the host memory by directly reading from the host memory without waiting for the CPU to fetch and send that data to the RAID controller. Then, the RAID controller is configured to compute the parity information based on the to-be-written data using a configured RAID mode (e.g., different RAID modes may compute the parity information using the to-be-written data differently and some RAID modes may not compute/store parity information at all). The RAID controller is configured to cause the parity information to be stored on a first subset of the plurality of storage devices (based on the specific RAID mode that is being implemented). The RAID controller is also configured to cause the to-be-written data to be stored on a second subset of the plurality of storage devices (based on the specific RAID mode that is being implemented). The storage devices are caused by the RAID controller, via write commands, to obtain the to-be-written data from a memory that is remote to the RAID controller. In various embodiments, storage devices are caused by the RAID controller to read the to-be-written data directly from the host memory using DMA and then to write the read to-be-written data locally at the second subset of the plurality of storage devices, where the second subset is selected based on the specific RAID mode that is being implemented. Because the storage devices of the RAID group are instructed to read the to-be-written data and/or the parity information directly from the host memory, the to-be-written data does not pass through the RAID controller and the RAID controller is thereby removed from acting as a source of the to-be-written data or parity information in the completion of write requests at the storage devices of the RAID group. In other examples where the RAID controller is configured to implement a RAID mode that does not require the computation of parity information (e.g., RAID 0, 1, or 10), the RAID controller is removed out of the write data path entirely and therefore avoids the possibility of acting as a bottleneck, as will be described in further detail below.

FIG. 1 is a diagram showing an embodiment of a system for implementing a direct memory access (DMA) data path for RAID storage. CPU 102 is configured to execute one or more applications at a host (e.g., a computer). CPU 102 is coupled to host memory 104, which is a main memory that is locally accessible by CPU 102 and is configured to store instructions to be executed by CPU 102. In various embodiments, host memory 104 comprises random access memory (RAM). CPU 102 is configured to send requests to RAID controller 108 for reading and writing data across at least storage devices 110, 112, 114, and 116, at least some of which could be associated with a RAID group. In various embodiments, each of storage devices 110, 112, 114, and 116 is a solid-state drive (SSD) with a nonvolatile memory express (NVMe) interface. RAID controller 108 comprises a hardware component that is configured to implement a RAID algorithm for data that is stored across the RAID group, comprising at least some of storage devices 110, 112, 114, and 116. In various embodiments, RAID controller 108 is an electronic circuit. For example, RAID controller 108 is a graphics processing unit (GPU), which is configured to perform rapid parallel calculations. The specific RAID algorithm that is implemented by RAID controller 108 is dependent on the specific RAID mode/level that RAID controller 108 is configured to implement. Different RAID modes/levels employ a different number of storage devices, the mirroring of data (e.g., storing multiple copies of the same data on two or more storage devices), and/or the usage of parity information (e.g., parity information is computed based on stored data and can be used to recover a portion of the stored data that becomes unavailable due to being stored on a failed storage device, for instance). For example, RAID 0, RAID 1, and RAID 10 do not use parity information but RAID 1 and RAID 10 do use the mirroring of data. Also, RAID 3, 4, 5, and 6 use parity information. As such, CPU 102 is configured to send requests to read and/or write data (e.g., associated with applications that it is executing) to RAID controller 108 for RAID controller 108 to process using a configured RAID mode and storage devices such as storage devices 110, 112, 114, and 116. Bus 106 comprises a hardware communication system that transfers data among its endpoints. In the example of FIG. 1, each of CPU 102, host memory 104, RAID controller 108, storage device 110, storage device 112, storage device 114, and storage device 116 are endpoints of bus 106 and can therefore communicate to one another over bus 106. Bus 106 may be connected to additional endpoints that are not shown in FIG. 1. In various embodiments, bus 106 comprises a Peripheral Component Interconnect Express (PCIe) bus, which is configured to enable high throughput communication.

To initiate a write operation, CPU 102 is configured to send a write request to RAID controller 108 over bus 106. In various embodiments, the write request from CPU 102 to RAID controller 108 includes location(s) (e.g., offsets and data lengths) within host memory 104 at which data that is to be distributed by RAID controller 108 over a RAID group are stored. In various embodiments, how RAID controller 108 stores the to-be-written data associated with the write request across storage devices such as storage devices 110, 112, 114, and 116 is transparent to CPU 102 and RAID controller 108 appears as a single NVMe drive to CPU 102. How RAID controller 108 handles the write request from CPU 102 depends on the RAID mode that RAID controller 108 is configured to implement, as will be described below.

In the event that RAID controller 108 is configured to implement a RAID mode that uses parity information (e.g., RAID 3, 4, 5, or 6), in response to receiving the write request, RAID controller 108 is configured to perform direct memory access (DMA) read operation(s) over bus 106 to the location(s) within host memory 104 that are provided in the write request to obtain the to-be-written data and then to generate parity information based on the to-be-written data that was obtained from host memory 104. After RAID controller 108 generates the parity information, in various embodiments, RAID controller 108 is configured to perform a DMA write operation at host memory 104 to write the parity information to host memory 104. Then, RAID controller 108 is configured to send a first set of write commands over bus 106 to a first subset of storage devices of the RAID group to cause that first subset of storage devices to perform DMA reads of the parity information from host memory 104 over bus 106 and to then write the parity information to the first subset of storage devices. For example, the first set of write commands includes the location(s) within host memory 104 from which to read the parity information and also the location(s) within the first subset of storage devices at which to store the parity information. RAID controller 108 is further configured to send a second set of write commands over bus 106 to a second subset of storage devices to cause that second subset of storage devices to perform DMA reads on the to-be-written data from host memory 104 over bus 106 and to then write the to-be-written data on the second subset of storage devices. For example, the second set of write commands includes the location(s) within host memory 104 from which to read the to-be-written data and also the location(s) within the second subset of storage devices at which to store the to-be-written data. In some embodiments, the first set of write commands and the second set of write commands can be issued by RAID controller 108 together in a single batch. As described herein, in handling write requests from CPU 102, in various embodiments in which RAID controller 108 is configured to store parity information that it has generated at host memory 104, RAID controller 108 minimizes the possibility of becoming a bottleneck to the completion of the write requests by instructing the relevant storage devices of the RAID group to directly obtain both the to-be-written data as well as the parity information from host memory 104 using DMA reads. In contrast to conventional hardware RAID cards in which the storage devices would need to read both the to-be-written data as well as the parity information from the RAID cards and in which the RAID cards themselves would become a constraint on the speed at which the write requests could be completed, RAID controller 108 neither stores the to-be-written data associated write request nor the generated parity information in its local memory.

In the event that RAID controller 108 is configured to implement a RAID mode that does not use parity information (e.g., RAID 0, 1, or 10), in response to receiving the write request, RAID controller 108 is configured to send a set of write commands over bus 106 to a subset of storage devices of the RAID group to cause that subset of storage devices perform DMA reads on the to-be-written data from host memory 104 over bus 106 and to then write the to-be-written data on the subset of storage devices. For example, the set of write commands includes the location(s) within host memory 104 from which to read the to-be-written data and also the location(s) within the subset of storage devices at which to store the to-be-written data. As described herein, in handling write requests from CPU 102, in various embodiments in which RAID controller 108 is not required to compute parity information, RAID controller 108 avoids becoming a bottleneck to the completion of the write requests by instructing the relevant storage devices of the RAID group to directly obtain the to-be-written data from host memory 104 using DMA reads. Put another way, in various embodiments in which RAID controller 108 is not required to compute parity information, RAID controller 108 is configured to receive only the write request and then, in turn, issue write commands to a subset of storage devices while all the DMA reads and writes of data are completed by storage devices via host memory 104. In contrast to conventional hardware RAID cards in which the storage devices would need to read the to-be-written data from the RAID cards and in which the RAID cards themselves would become a constraint on the speed at which the write requests could be completed, RAID controller 108 does not store the to-be-written data associated write request in its local memory.

Therefore, according to some embodiments described herein, the impact of RAID controller 108 as a bottleneck in the data path of writing data to the RAID storage devices is either minimized or removed entirely. Also, in contrast to conventional software RAID implementations within the CPU, in various embodiments described herein, CPU 102 does not need to use its resources to implement the RAID algorithm and can instead treat RAID controller 108 as a single NVMe storage device that handles read and write requests, which RAID controller 108 does so in part by implementing the RAID algorithm.

In some other embodiments, while processing the write request, RAID controller 108 is configured store the parity information in its own local memory (not shown in FIG. 1) (instead of performing a DMA write to write the parity information to host memory 104). As a result, RAID controller 108 is configured to send a first set of write commands over bus 106 to a first subset of storage devices to cause that first subset of storage devices to perform DMA reads over bus 106 of the parity information from host memory 104 and to then write the parity information to the first subset of storage devices. In the event that RAID controller 108 has stored the parity information in its own local memory, RAID controller 108 is further configured to send a second set of write commands over bus 106 to a second subset of storage devices to cause that second subset of storage devices to perform DMA reads over bus 106 on RAID controller 108's local memory to obtain the to-be-written data and to then write the to-be-written data to the second subset of storage devices. In contrast to conventional RAID cards in which the storage devices would need to read both the to-be-written data as well as the parity information from the RAID cards and in which the RAID cards themselves would become a constraint on speed at which the write requests could be completed, in such embodiments, RAID controller 108 does not store the to-be-written data associated write request in its local memory and could still enable the storage devices to complete the write requests without needing to read the to-be-written data associated write request from RAID controller 108's local memory.

To initiate a read operation, CPU 102 is configured to send a read request to RAID controller 108 over bus 106. In various embodiments, the read request from CPU 102 to RAID controller 108 includes identifying information (e.g., offsets and data lengths) associated with where the requested data, after being read from the storage devices, should be stored within host memory 104. In various embodiments, the read request from CPU 102 to RAID controller 108 also includes an offset on the emulated NVMe device that is being implemented by RAID controller 108 and a length of the requested data. In response to receiving the read request, RAID controller 108 is configured to first determine to use the relevant RAID mode to determine on which storage device(s) the requested data is stored. Then, RAID controller 108 is configured to send read commands to those of the storage device(s) (e.g., among storage devices 110, 112, 114, and 116) on which the requested data is stored. In some embodiments, each read command that is sent from RAID controller 108 to a particular storage device includes at least a location at which at least a portion of the requested data is stored within the storage device. The read command is configured to cause the recipient storage device to read the requested (portion of) data and then perform a DMA write of the read data to host memory 104 over bus 106. For example, the requested data is stored at host memory 104 at a location that is included in the read request and where the location is determined by the requesting user. In the event that all of the storage devices to which RAID controller 108 had sent a read command are available (healthy/not failed) and thus able to locally read the requested data and then perform DMA writes of the data to host memory 104, no parity information (if any is stored) is needed to be retrieved from a storage device and RAID controller 108 is also able to complete the read request without needing to locally store the requested data to be read. Put another way, where none of the storage devices on which the requested data is stored have failed or have otherwise become unavailable, RAID controller 108 is configured to facilitate a read request from CPU 102 across the storage device(s) (e.g., among storage devices 110, 112, 114, and 116) without becoming a bottleneck by being an intermediary location where the requested data is stored and before the requested data is placed on host memory 104. Therefore, according to some embodiments described herein, RAID controller 108 is removed from the data path of reading data from the RAID storage devices.

However, in the event that at least one of the storage devices to which RAID controller 108 had sent a read command has failed or has otherwise become unavailable, then RAID controller 108 is configured to read the parity information (if any is stored) that is stored on the storage device(s) and then reconstruct the missing portion of the requested data. For example, to read the parity information, RAID controller 108 is configured to send read commands to the storage devices to cause the storage devices to locally read the stored parity information and then to write the parity information to host memory 104 using DMA. The remaining available (not failed) storage devices to which RAID controller 108 had sent read commands to are configured to locally read the requested data then perform DMA writes of the read data to host memory 104. RAID controller 108 is configured to then perform a DMA write to write the reconstructed (portion) of the requested data to host memory 104 over bus 106, thereby completing the read request.

As described with FIG. 1 and will be shown in various examples detailed below, in various embodiments, RAID controller 108 is configured to complete write requests for local hosts such as CPU 102 by causing the relevant storage devices of a RAID group to retrieve the to-be-written data from a location (host memory 104) that is not local to RAID controller 108 itself and RAID controller 108 also does not become a location through which the to-be-written data passes through before it is distributed across the storage devices of the RAID group. Furthermore, as described with FIG. 1 and will be shown in various examples detailed below, in various embodiments, RAID controller 108 is configured to complete read requests for local hosts such as CPU 102 by causing the relevant storage devices of the RAID group to locally read the requested data and then store the data at a location (host memory 104) that is remote (not local) to RAID controller 108 and RAID controller 108 also does not become a location through which the read data passes through before it is written to host memory 104, in the event where all such storage devices are healthy (e.g., not failed or otherwise unavailable). By leveraging the storage devices of a RAID group to directly issue DMA reads and writes, RAID controller 108 is able to efficiently complete host initiated read and write requests to the RAID group.

Figure 2:
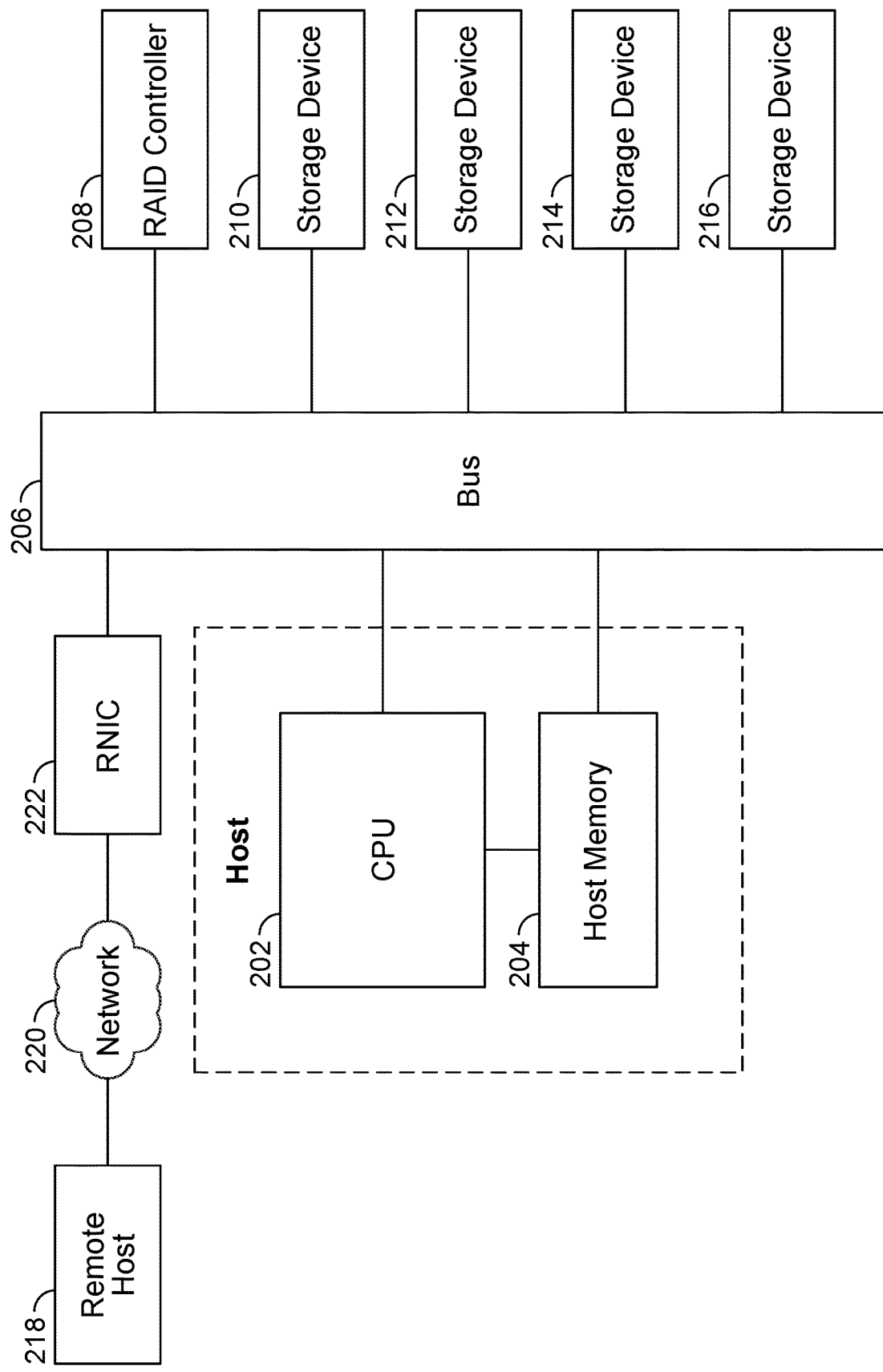
FIG. 2 is a diagram showing an embodiment of a system for implementing a direct memory access (DMA) data path for RAID storage for a host that is remote to a set of RAID storage devices.

FIG. 2 is a diagram showing an embodiment of a system for implementing a direct memory access (DMA) data path for RAID storage for a host that is remote to a set of RAID storage devices. In the example of FIG. 2, RDMA Network Interface Controller (RNIC) 222 is configured to communicate with remote host 218 over network 220. RNIC 222 is hardware that is configured to accelerate a path for multiple hosts to perform DMA operations with respect to each other. In contrast to CPU 202, which is local to the RAID group comprising at least some of storage devices 210, 212, 214, and 216, remote host 218 is remote to (e.g., separated by at least network 220 from) the RAID group. Nevertheless, in various embodiments, RNIC 222 can still perform efficient read requests on behalf of remote host 218 by performing DMA reads on at least the portions of memories of storage devices such as storage devices 210, 212, 214, and 216, for example, that are exposed. In some embodiments, portions of memories of storage devices can be exposed to RNIC 222 via the controller memory buffers (CMB) feature of the NVMe protocol. To initiate a read operation, remote host 218 is configured to send a read request to RNIC 222 over network 220. RNIC 222 is then configured to send the read request to RAID controller 208. Based on the received read request, RAID controller 208 is configured to determine the locations (e.g., addresses/locations) on the relevant storage devices (e.g., among at least storage devices 210, 212, 214, and 216) to access the requested data. RAID controller 208 is then configured to send read commands to the relevant storage devices to cause those storage devices to copy the requested data to their respective local CMBs. RAID controller 208 is configured to send to RNIC 222 the locations of the relevant storage device's CMBs. RNIC 222 is then configured to perform DMA reads at the CMB locations of the storage device over bus 206 to obtain the requested data. After RNIC 222 obtains the requested data based on the DMA reads, RNIC 222 is configured to return the requested data back to remote host 218 over network 220. As described with FIG. 2 and will be described in further detail below, data distributed across the RAID group comprising at least some of storage devices 210, 212, 214, and 216 can be read by remote host 218 via RNIC 222 in a manner that does not require the data to pass through either the local host (e.g., host memory 204) or RAID controller 208 that is configured to implement RAID across those storage devices.

Figure 3:
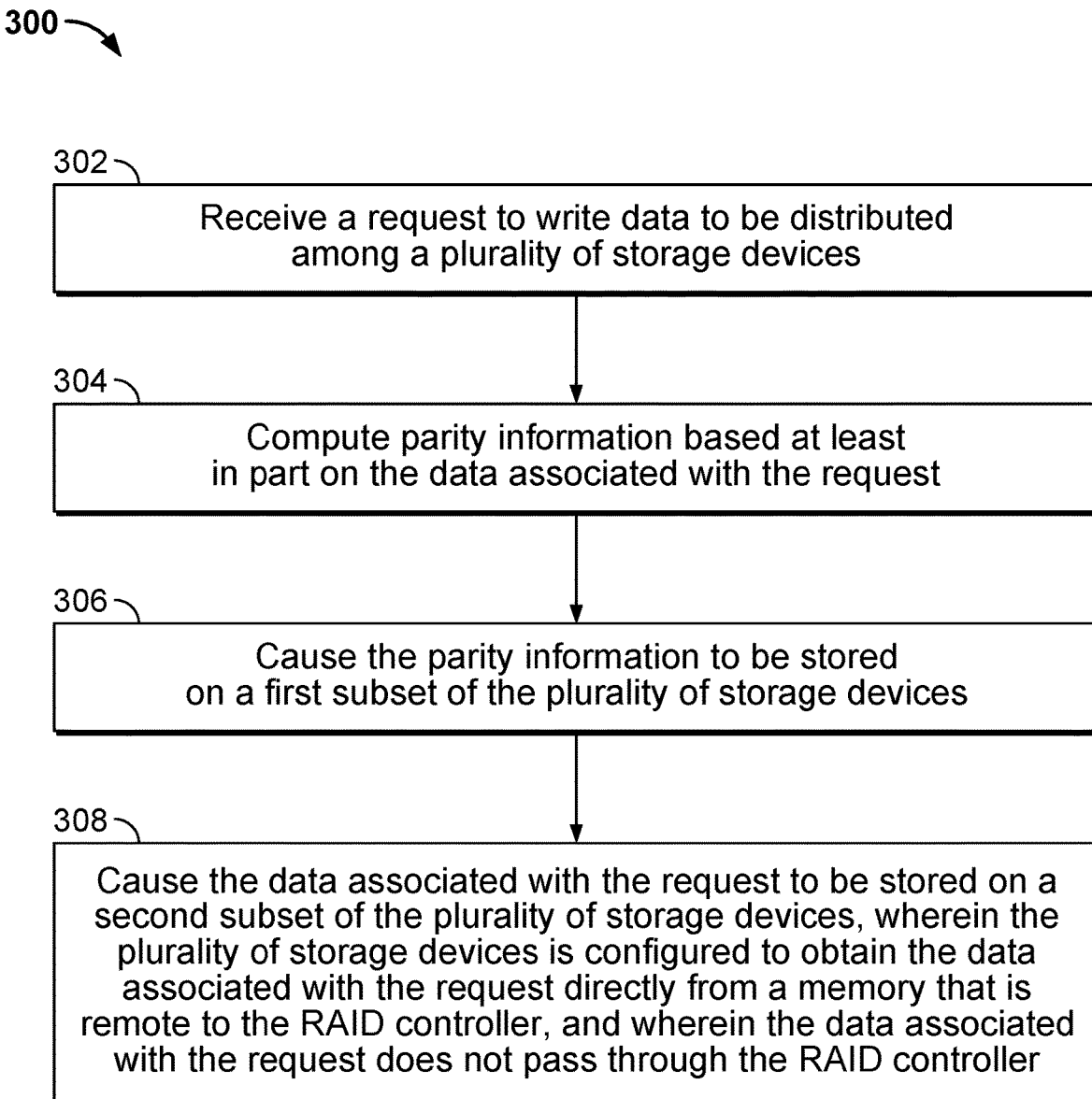
FIG. 3 is a flow diagram showing an embodiment of a process for processing a write request to a plurality of storage devices.

FIG. 3 is a flow diagram showing an embodiment of a process for processing a write request to a plurality of storage devices. In some embodiments, process 300 is implemented by RAID controller 108 of FIG. 1.

At 302, a request to write data to be distributed among a plurality of storage devices is received. In various embodiments, the write request is received from a CPU of a host. For example, the write request is generated during the execution of an application. The write request includes one or more locations at which the data that is to be written to the storage devices are stored on the host (e.g., at the host memory).

At 304, parity information is computed based at least in part on the data associated with the request. For RAID modes (e.g., RAID 3, 4, 5, or 6) that use parity, the RAID controller is configured to perform DMA reads on the host memory using the locations indicated in the write request and to compute the parity information based on the read data.

At 306, the parity information is caused to be stored on a first subset of the plurality of storage devices. In various embodiments, the RAID controller is configured to perform a DMA write operation over the (e.g., PCIe) bus that connects the RAID controller to the host memory to write the computed parity information onto the host memory. Then, in various embodiments, the RAID controller is configured to send write command(s) to the one or more storage devices that are designated to store the parity information. Such write command(s) include the locations within the host memory that the parity information had been written to. In response to receiving these write command(s), the storage device(s) are configured to perform DMA read operation(s) to the host memory to retrieve the parity information and to then locally store (on the storage device(s)) the parity information.

At 308, the data associated with the request is caused to be stored on a second subset of the plurality of storage devices, wherein the plurality of storage devices is configured to obtain the data associated with the request directly from a memory that is remote to a RAID controller, and wherein the data associated with the request does not pass through the RAID controller. The RAID controller is configured to send write command(s) to the storage devices that are designated to store the to-be-written data. Such write command(s) include the locations within the host memory that the to-be-written data had been stored at the host (these locations were included in the write request that had been received from the CPU). In response to receiving these write command(s), the storage device(s) are configured to perform DMA read operations to the host memory to retrieve the to-be-written data and to then locally store (on the storage device(s)) the to-be-written data. Because the RAID controller had stored the parity information onto the host memory and also caused the storage devices to directly read the to-be-written data from the host memory, the to-be-written data and the related parity information are retrieved from a location (the host memory) that is remote from the RAID controller instead of being retrieved from the RAID controller itself.

Figure 4:
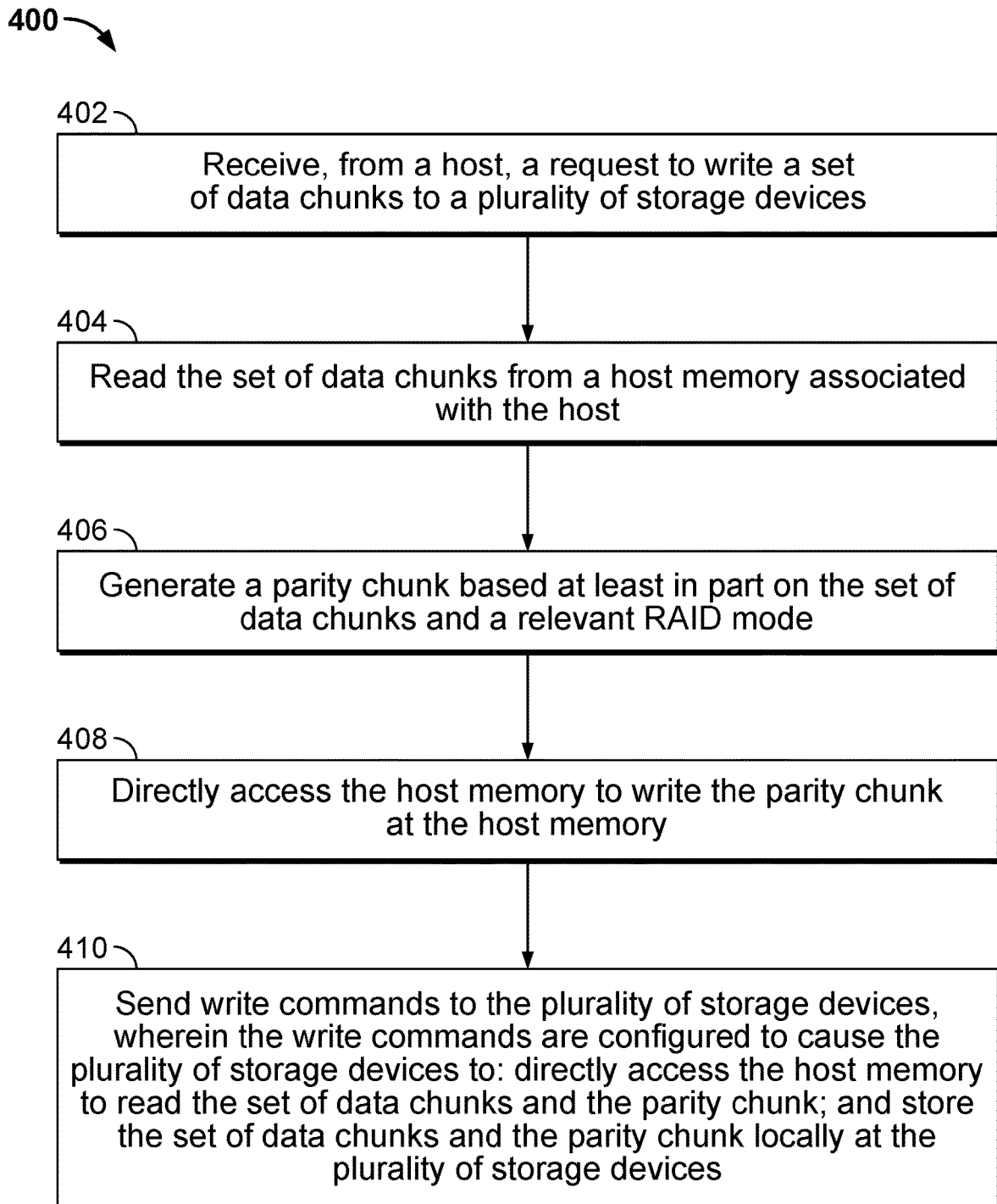
FIG. 4 is a flow diagram showing an example of a process for processing a write request to a plurality of storage devices.

FIG. 4 is a flow diagram showing an example of a process for processing a write request to a plurality of storage devices. In some embodiments, process 400 is implemented by RAID controller 108 of FIG. 1. In some embodiments, process 300 of FIG. 3 can be implemented, at least in part, by process 400.

At 402, a request to write a set of data chunks to a plurality of storage devices is received from a host. In various embodiments, the write request is received from a CPU of a host. The write request includes one or more locations at which the set of data chunks that is to be written to the storage devices is stored on the host (e.g., at the host memory).

At 404, the set of data chunks is read from a host memory associated with the host. The set of data chunks is read from the host memory over a (e.g., PCIe) bus by the RAID controller using the location(s) that were included in the write request.

At 406, a parity chunk is generated based at least in part on the set of data chunks and a relevant RAID mode. For RAID modes (e.g., RAID 3, 4, 5, or 6) that use parity, the RAID controller is configured to compute the parity information based on the read set of data chunks.

At 408, the host memory is directly accessed to write the parity chunk at the host memory. In various embodiments, the RAID controller performs a DMA write over the bus to write the parity chunk at the host memory.

At 410, write commands are sent to the plurality of storage devices, wherein the write commands are configured to cause the plurality of storage devices to directly access the host memory to read the set of data chunks and the parity chunk; and store the set of data chunks and the parity chunk locally at the plurality of storage devices. The RAID controller is configured to send write commands to the storage devices and where the write commands include the locations at the host memory at which the set of data chunks and also the parity chunk are stored. For example, each write command includes either the address of a data chunk and/or the address of the parity chunk (e.g., the parity chunk may be stored contiguous to a data chunk) within the host memory. The storage devices are then configured to perform read DMA reads over the bus to access the host memory and to read the set of data chunks as well as the parity chunk. Each storage device is configured to locally write either the read data chunk or the read parity chunk to complete the write request.

Figure 5A:
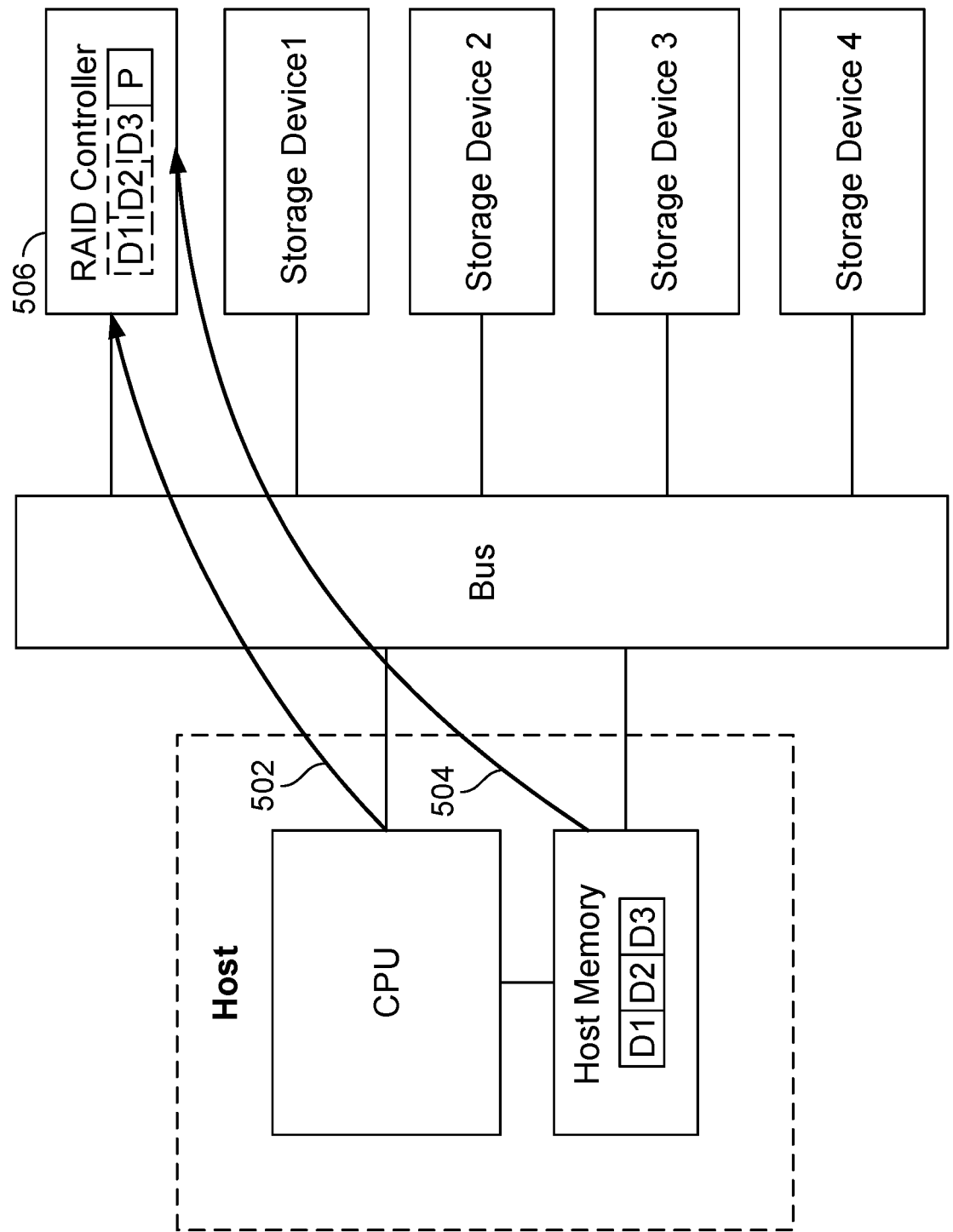
FIGS. 5A and 5B show an example process of completing a write request, which is received from a host, across a RAID group of storage devices.
Figure 5B:
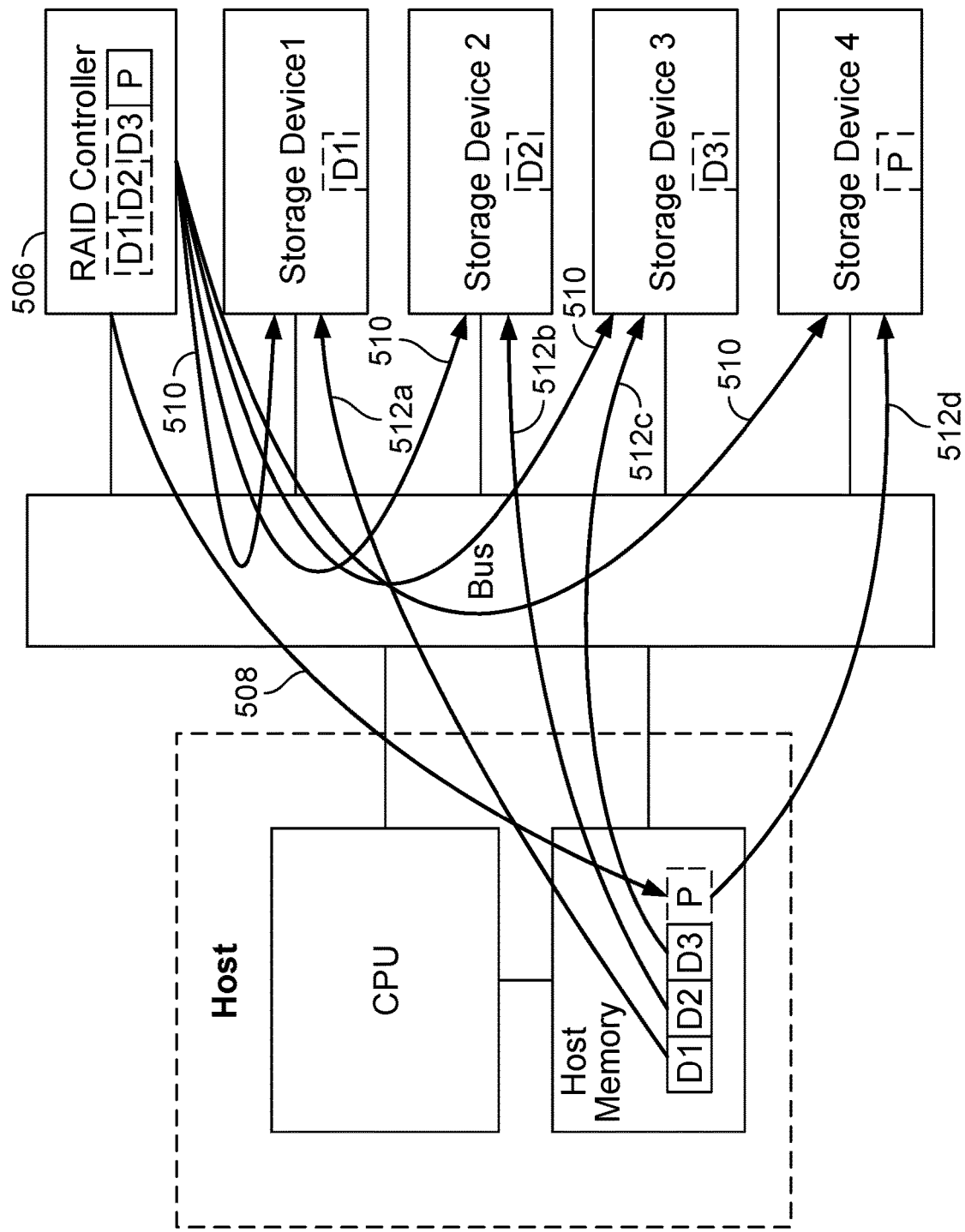

FIGS. 5A and 5B show an example process of completing a write request, which is received from a host, across a RAID group of storage devices. FIGS. 5A and 5B show an example process, which can be used, at least in part, to implement process 300 of FIG. 3 or process 400 of FIG. 4.

In FIG. 5A, at step 502, the CPU of the host sends a write request to the RAID controller and where the request requests the RAID controller to write data chunks D1, D2, and D3 to storage. The write request includes the locations (e.g., offsets and data lengths) at which data chunks D1, D2, and D3 are stored at the host memory that is associated with the CPU. At step 504, in response to receiving the write request, the RAID controller is configured to perform DMA read operations over the (e.g., PCIe) bus to the host memory at the locations that were provided in the write request to read data chunks D1, D2, and D3 from the host memory. Assuming that the RAID controller is implementing a RAID mode that involves the use of parity information, at 506, the RAID controller then computes a parity chunk, P, based on read data chunks D1, D2, and D3.

The example of FIG. 5A continues in FIG. 5B. In FIG. 5B, at 508, the RAID controller is configured to perform a DMA write operation over the bus to the host memory to write the parity chunk, P, to the host memory. Then, at 510, the RAID controller is configured to send write commands over the bus to Storage Devices 1, 2, 3, and 4 to cause Storage Devices 1, 2, 3, and 4, respectively, to perform DMA read operations over the bus to read data chunk D1, data chunk D2, data chunk D3, and parity chunk P. The respective write commands sent by the RAID controller to Storage Devices 1, 2, 3, and 4 includes the respective locations of data chunk D1, data chunk D2, data chunk D3, and parity chunk P in the host memory. At steps 512a, 512b, 512c, and 512d, Storage Devices 1, 2, 3, and 4 perform the DMA read operations over the bus to read data chunk D1, data chunk D2, data chunk D3, and parity chunk P from the host memory and also respectively to locally write data chunk D1, data chunk D2, data chunk D3, and parity chunk P. As shown in the example of FIGS. 5A and 5B, the RAID controller, as described in various embodiments described herein, is configured to facilitate the completion of a CPU's write request without becoming a source from which the storage devices are to read data chunks or parity chunks.

FIGS. 6A through 6D show an example of command queues involved in a RAID controller facilitating a write request without becoming inline to the write data path for a RAID mode that does not use parity information. In the specific example that is described across FIGS. 6A through 6D, the RAID controller is configured to implement RAID mode 0 by splitting data evenly across two storage devices without using parity information or redundancy.

Figure 6A:
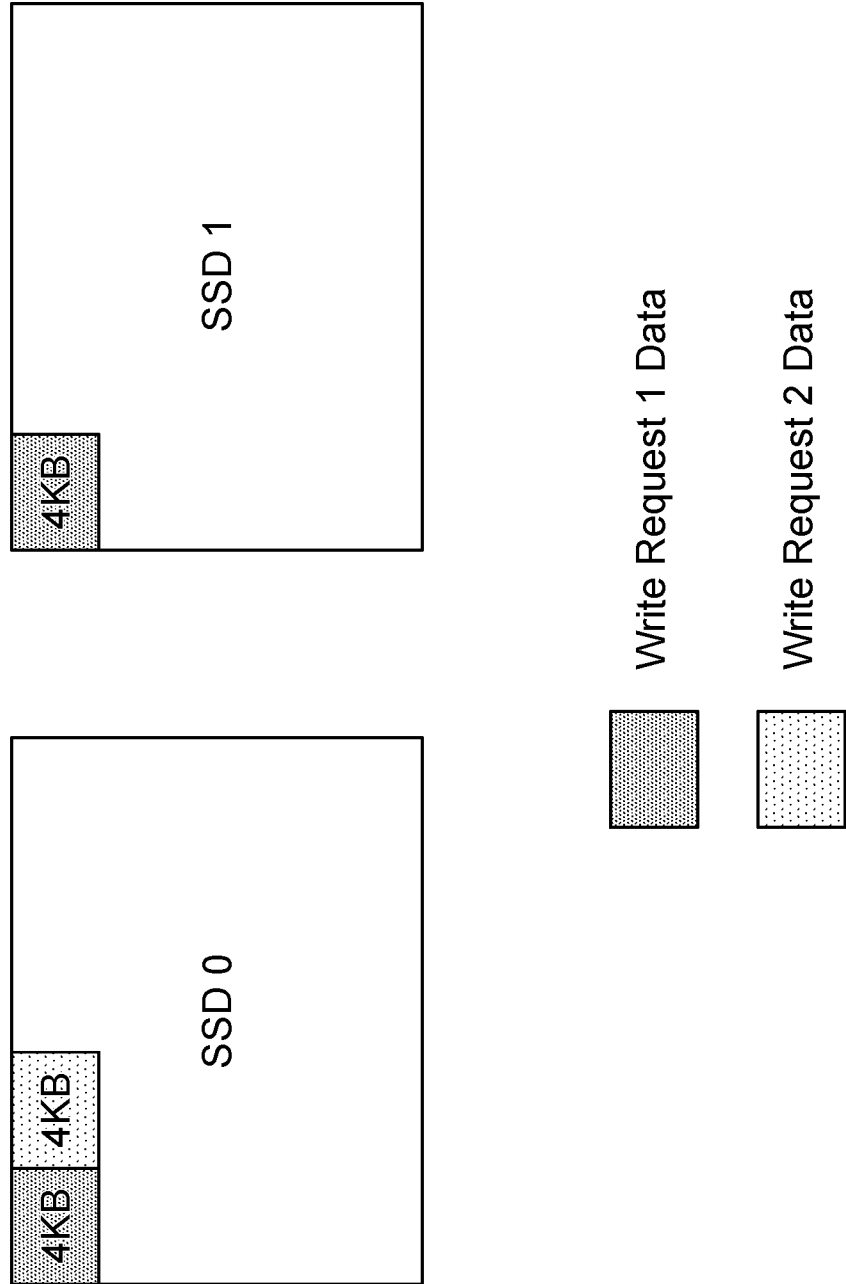
FIGS. 6A through 6D show an example of command queues involved in a RAID controller facilitating a write request without becoming inline to the write data path for a RAID mode that does not use parity information.

FIG. 6A shows the results of writing data associated with two write requests (Write Request 1 and Write Request 2) to two storage devices (SSD 0 and SSD 1) of a RAID group using RAID 0 mode, which splits data even across the two storage devices and also does not use parity information. In the example described across FIGS. 6A through 6D, a host (not shown) has issued Write Request 1 and Write Request 2 to be completed at storage devices, SSD 0 and SSD 1, which are associated with a RAID group. Write Request 1 requested to write 8 KB of data at offset 0 to the RAID group comprising SSD 0 and SSD 1. Because 4 KB is the configured page size and is therefore the minimum unit of data that is used by the storage devices, a RAID controller (not shown) implementing RAID 0 processed Write Request 1 by splitting the 8 KB of data into two chunks of 4 KB and 4 KB that were then respectively distributed across SSD 0 and SSD 1. Write Request 2 requested to write 4 KB of data at offset 8 KB to the RAID group comprising SSD 0 and SSD 1. Given that the 4 KB size of data associated with Write Request 2 matches the unit of data that is written to the storage devices, the RAID controller (not shown) implementing RAID 0 does not need to split the Write Request 2 but can cause the 4 KB of data to be written to just SSD 0.

Figure 6B:
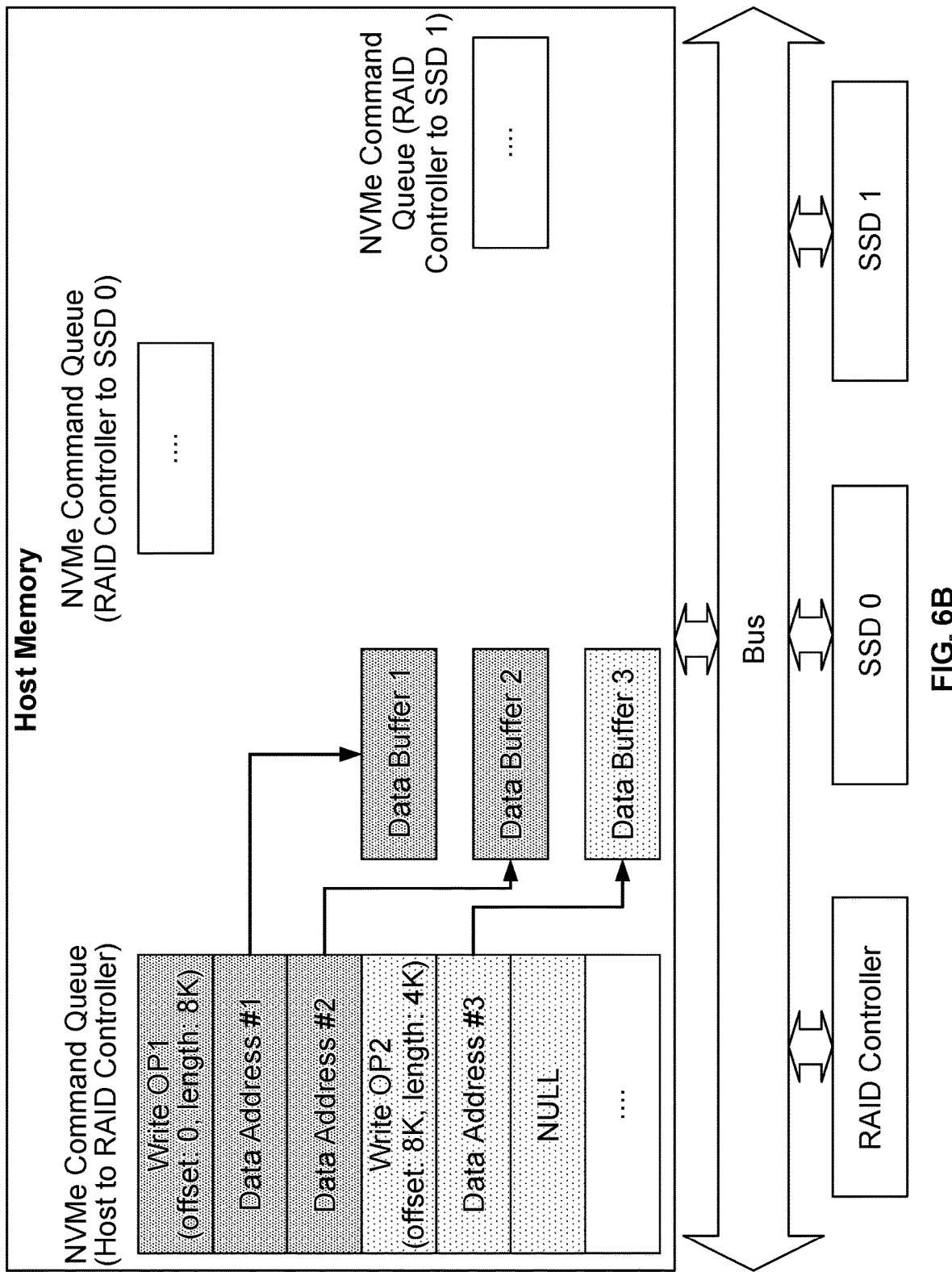

FIG. 6B shows an example of where data associated with Write Requests 1 and 2 are stored within the host memory of the host. In the example shown across FIGS. 6A through 6D, the NVMe protocol is used by the host's CPU to communicate with the RAID group over the (e.g., PCIe) Bus. As such, the host memory stores a (e.g., virtual) queue called the "NVMe Command Queue (Host to RAID Controller)" that stores instructions associated with Write Request 1 and Write Request 2 from the host to the RAID Controller. Specifically, the "NVMe Command Queue (Host to RAID Controller)" stores the parameters (offset: 0, length: 8K) of Write Request 1 ("Write OP1") and also the addresses (Data Address #1 and Data Address #2) of each 4 KB chunk of the 8 KB data that is associated with Write Request 1. Each of the addresses (Data Address #1 and Data Address #2) associated with Write Request 1 points to a respective location (Data Buffer 1 or Data Buffer 2) in a data buffer of the host memory at which the respective 4 KB associated with Write Request 1 is stored. Furthermore, the NVMe Command Queue (Host to RAID Controller)" stores the parameters (offset: 8K, length: 4K) of Write Request 2 ("Write OP2") and also the address (Data Address #3) of the 4 KB chunk that is associated with Write Request 2. The data address (Data Address #3) associated with Write Request 2 points to a location (Data Buffer 3) in a data buffer of the host memory at which the respective 4 KB associated with Write Request 2 is stored.

Figure 6C:
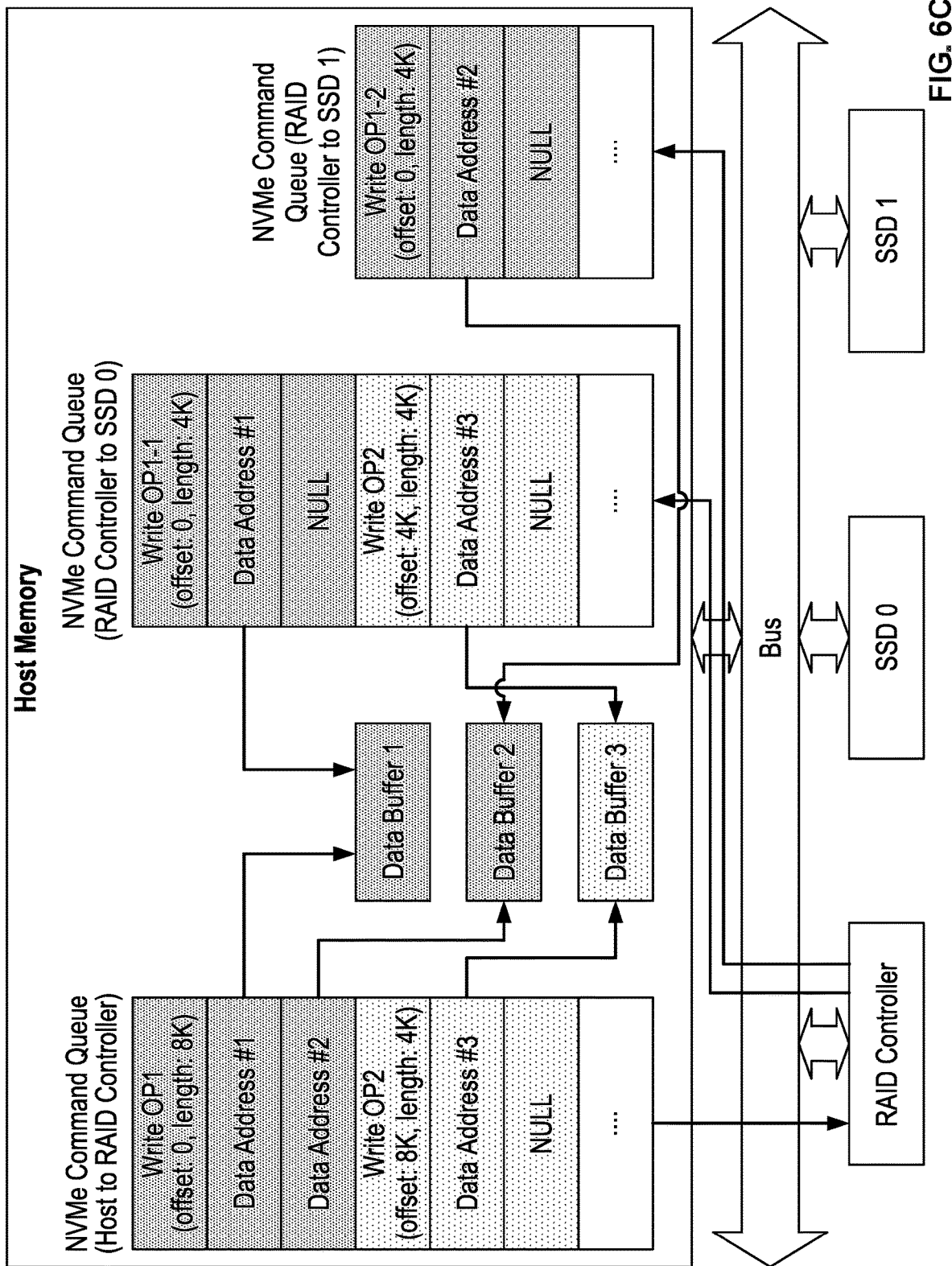

FIG. 6C shows an example of how the RAID Controller executes the commands stored in the "NVMe Command Queue (Host to RAID Controller)." Specifically, the RAID controller performs DMA read operations on the "NVMe Command Queue (Host to RAID Controller)" that is stored in the host memory over the Bus to obtain requests from the host. Based on the information stored associated with Write Request 1 ("Write OP1") in "NVMe Command Queue (Host to RAID Controller)," the RAID Controller will perform DMA reads over the Bus to obtain the locations of Data Buffer 1 and Data Buffer 2 from Data Address #1 and Data Address #2. The RAID Controller implements RAID 0 on Write Request 1 by determining that the 8 KB associated with Write Request 1 should be split across SSD 0 and SSD 1 as two 4 KB chunks. The RAID Controller then sends corresponding write commands over the Bus to SSD 0 and SSD 1 including by updating, using DMA writes over the Bus, the (e.g., physical) queue called the "NVMe Command Queue (RAID Controller to SSD 0)" and "NVMe Command Queue (RAID Controller to SSD 1)" that are located in the host memory to include instructions associated with Write Request 1 that are respectively relevant to SSD 0 and SSD 1. Specifically, the RAID controller stores in the "NVMe Command Queue (RAID Controller to SSD 0)," the parameters (offset: 0, length: 4K) associated with the parameters of Write Request 1 ("Write OP1-1") and also the address (Data Address #1) that are relevant to SSD 0. The RAID Controller also stores in the "NVMe Command Queue (RAID Controller to SSD 1)" the parameters (offset: 0, length: 4K) associated with the parameters of Write Request 1 ("Write OP1-2") and also the address (Data Address #2) that are relevant to SSD 1.

Based on the information stored associated with Write Request 2 ("Write OP2") in "NVMe Command Queue (Host to RAID Controller)," the RAID Controller will perform DMA reads over the Bus to obtain the location of Data Buffer 3 from Data Address #3. The RAID Controller implements RAID 0 on Write Request 2 by determining that the 4 KB associated with Write Request 2 does not need to be split and can instead be stored at only SSD 0. The RAID Controller then sends a corresponding write command over the Bus to SSD 0 including by updating the (e.g., physical) queue called the "NVMe Command Queue (RAID Controller to SSD 0)" located in the host memory to include instructions associated with Write Request 2 that are relevant to SSD 0. Specifically, the RAID controller stores in the "NVMe Command Queue (RAID Controller to SSD 0)," the parameters (offset: 4K, length: 4K) associated with the parameters of Write Request 2 ("Write OP2") and also the address (Data Address #3).

Figure 6D:
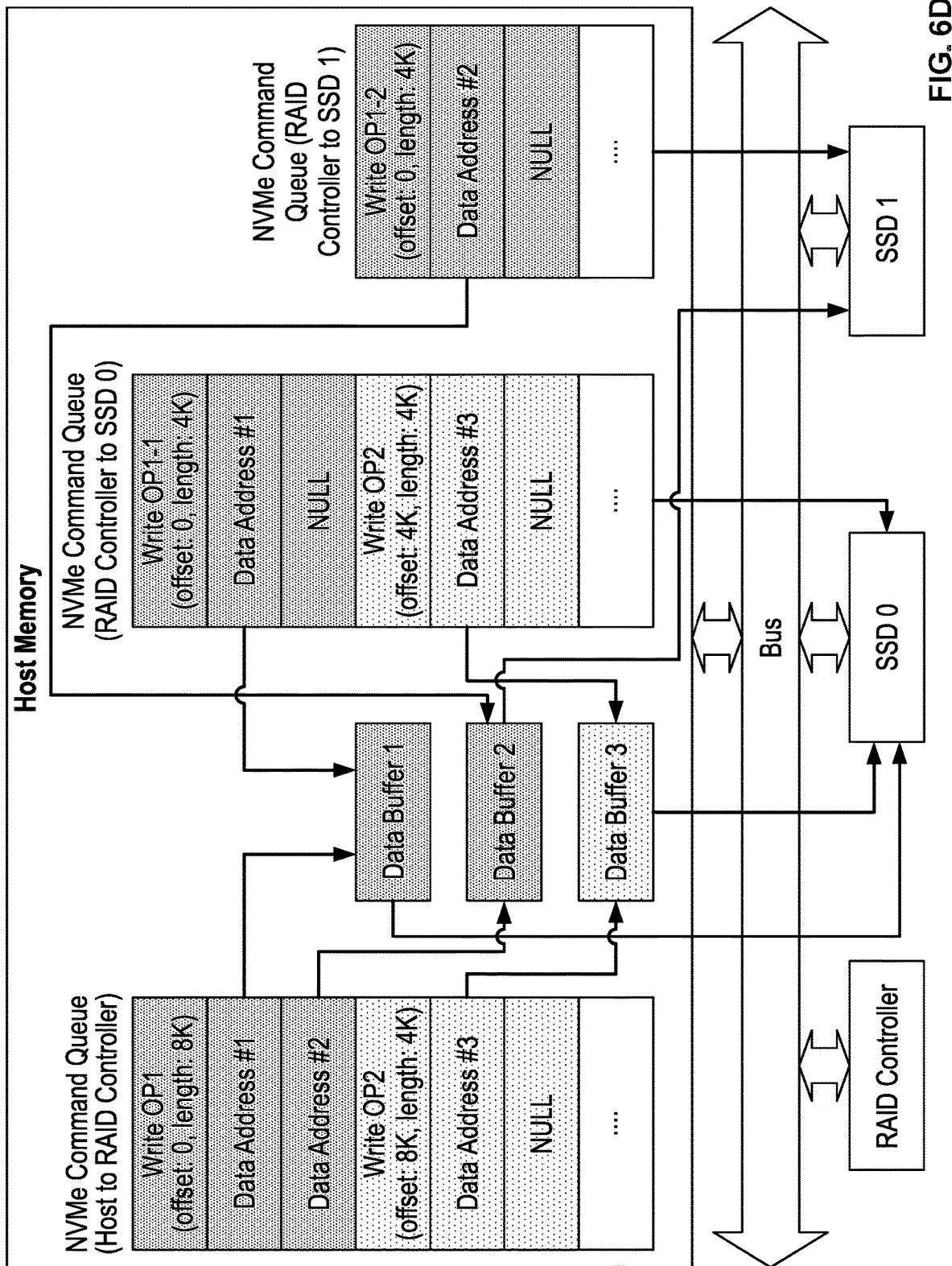

FIG. 6D shows an example of how SSD 0 and SSD 1 executes the commands stored in the "NVMe Command Queue (RAID Controller to SSD 0)" and "NVMe Command Queue (RAID Controller to SSD 1)," respectively.

Each of SSD 0 and SSD 1 will pull commands that are stored in their respective RAID controller to SSD NVMe Command Queue from the host memory and then execute the commands. For example, SSD 0 will perform a DMA read over the Bus to read the write command associated with "Write OP1-1" from the "NVMe Command Queue (RAID Controller to SSD 0)" and obtain Data Address #1. SSD 0 will then perform a DMA read over the Bus to Data Buffer 1 associated with Data Address #1 to obtain the first 4 KB data chunk associated with Write Request 1 and then write it to its own offset 0. Similarly, SSD 0 will perform a DMA read over the Bus to read the write command associated with "Write OP2" from the "NVMe Command Queue (RAID Controller to SSD 0)" and obtain Data Address #3. SSD 0 will then perform a DMA read over the Bus to Data Buffer 3 associated with Data Address #3 to obtain the 4 KB data chunk associated with Write Request 2 and then write it to its own offset 4 KB.

Also, for example, SSD 1 will perform a DMA read over the Bus to read the write command associated with "Write OP1-2" from the "NVMe Command Queue (RAID Controller to SSD 1)" and obtain Data Address #2. SSD 0 will then perform a DMA read over the Bus to Data Buffer 2 associated with Data Address #2 to the second 4 KB data chunk associated with Write Request 1 and then write it to its own offset 0.

As shown in the example of completing two write requests using a RAID mode that does not involve parity information that is described across FIGS. 6A through 6D, DMA read and write operations can be leveraged by storage devices of a RAID group in completing write requests in a way that removes the RAID controller out of the data path of obtaining the data-to-be written and writing such data to the storage devices.

While the example across FIGS. 6B through 6D shows one "NVMe Command Queue (Host to RAID Controller)" queue, in other examples, multiple such queues can be maintained for each SSD/storage device. For example, each instance of the "NVMe Command Queue (Host to RAID Controller)" can be associated with a different user or a different application, where each user or application is bound to a different core. While the example across FIGS. 6A through 6D shows one "NVMe Command Queue (RAID Controller to SSD 0)" queue for SSD 0 and one "NVMe Command Queue (RAID Controller to SSD 1)" queue for SSD 1, in other examples, multiple such queues can be maintained for each SSD/storage device. By leveraging multiple "NVMe Command Queue (RAID Controller to SSD)" queues per single SSD, IO jobs running in the RAID controller can be parallelized to use multiple queues at the same time.

Figure 7:
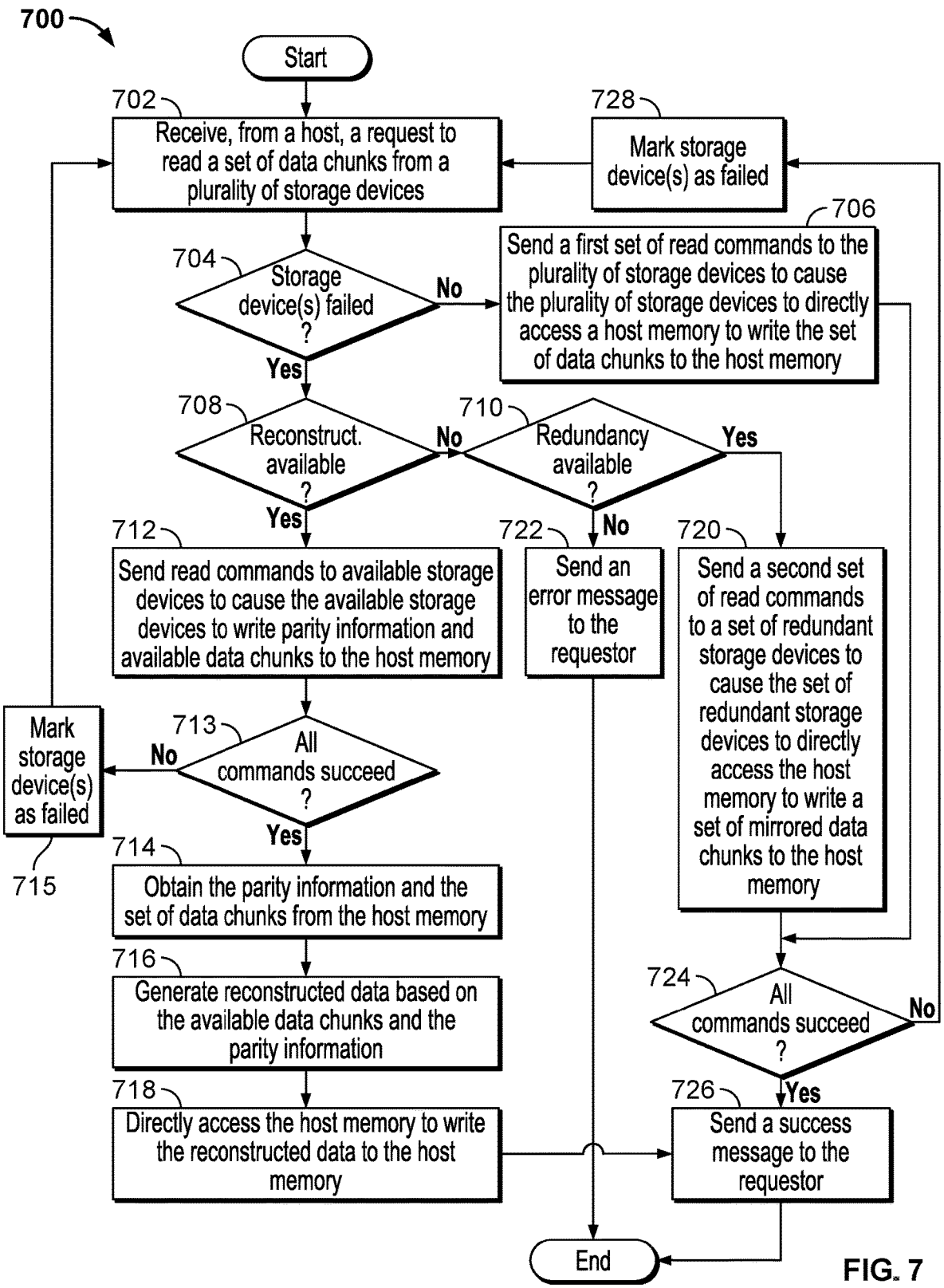
FIG. 7 is a flow diagram showing an embodiment of a process for processing a read request to a plurality of storage devices.

FIG. 7 is a flow diagram showing an embodiment of a process for processing a read request to a plurality of storage devices. In some embodiments, process 700 is implemented by RAID controller 108 of FIG. 1.

At 702, a request to read a set of data chunks from a plurality of storage devices is received from a host. In various embodiments, the set of data chunks that is requested to be read by the request is stored across storage devices that are associated with a RAID group. Data is distributed and/or mirrored across the storage devices in a manner that is associated with the RAID mode with which the RAID controller was configured to implement when the data was stored at the storage devices.

At 704, whether at least one of the plurality of storage devices has failed is determined. In the event that at least one of the plurality of storage devices has failed, control is transferred to 708. Otherwise, in the event that none of the plurality of storage devices has failed, control is transferred to 706. In a first example, a storage device to which the RAID controller had sent a read command is determined to have failed in the event that the storage device does not respond to the RAID controller within a predetermined period of time. In a second example, a storage device to which the RAID controller had sent a read command is determined to have failed when the RAID controller receives from the storage device a report with a status code in the completion queue. In a third example, a storage device to which the RAID controller had sent a read command is determined to have failed when a hardware removal event is captured by an operating system and redirected to the RAID controller. In a fourth example, a storage device to which the RAID controller had sent a read command is determined to have failed when a DMA error is captured when the storage device's completion queue is polled by the host. The NVMe protocol provides a pair comprising a completion queue and a submission queue for each NVMe storage device. If the storage device is healthy and completes the request, it will put a completion queue entry to its completion queue with status code set to SUCCESS. The storage device's submission queue is polled by the storage device (who executes the commands) and the completion queue is polled by the host (who issues the commands).

At 706, a first set of read commands is sent to the plurality of storage devices to cause the plurality of storage devices to directly access a host memory to write the set of data chunks to the host memory. The RAID controller is configured to use the read request and the RAID mode (e.g., 0, 1, 2, 3, 4, 5, 6, 01, or 10) that it is configured to implement to identify storage devices that should store the set of data chunks. The RAID controller is then configured to send read commands to the identified storage devices that have been determined to each store at least a portion of the set of data chunks. In response to receiving the read commands, the storage devices are configured to obtain the requested data chunks and then directly access the host memory using DMA writes to write the requested data chunks to the host memory.

At 708, whether reconstruction is available to reconstruct data chunks stored on failed storage device(s) is determined. In the event that reconstruction is available to reconstruct data chunks on the failed storage device(s), control is transferred to 712. Otherwise, in the event that reconstruction is not available to reconstruct data chunks on the failed storage device(s), control is transferred to 710. Reconstruction is available to be used to reconstruct the requested data chunks ("unavailable" data chunks) in the event that a RAID mode that uses parity information (e.g., RAID 3, 4, 5, or 6) was used to store the data and the parity information is stored on an available (not failed) storage device. Reconstruction is not available in the event that a RAID mode that uses parity information (e.g., RAID 3, 4, 5, or 6) was used to store the data but the parity information is stored on a failed storage device. Reconstruction is not available in the event that a RAID mode that does not use parity information (e.g., RAID 0, 1, or 10) was used to store the data.

At 710, whether redundancy of the data chunks that are stored on the failed storage devices is available is determined. In the event that redundancy of the data chunks that are stored on the failed storage devices is available, control is transferred to 720. Otherwise, in the event that redundancy of the data chunks that are stored on the failed storage devices is not available, control is transferred to 722. Where parity information is not available to reconstruct the unavailable data chunks, the unavailable data chunks may still be obtained from an available (not failed) storage device which stores a redundant/mirrored copy of the data chunk(s) that had been requested from a failed storage device. As mentioned above, certain RAID modes (e.g., RAID 0, 1, and 10) redundantly store the same data in two or more storage devices.

At 712, read commands are sent to available storage devices to cause the available storage devices to write parity information and available data chunks to the host memory. Parity information was computed based on the unavailable data chunks and therefore can be used to reconstruct the unavailable data chunks. The RAID controller sends read commands to the available (not failed) storage devices to cause those storage devices to locally read the available data chunks (a subset of the requested data chunks) and the associated parity information and then to write the available data chunks and the associated parity information to the host memory.

At 713, it is determined whether all of the read commands sent at step 712 are successful. In the event that all of the read commands sent at step 712 are successful, control is transferred to 714. Otherwise, in the event that at least one of the read commands sent at step 712 is not successful, control is transferred to 715. For example, a read command is determined to succeed if it can be completed by the corresponding storage device. Also, for example, a read command is determined to fail if the corresponding storage device cannot complete the read command and/or sends a failure message back to the RAID controller.

At 715, the storage device(s) at which read commands sent at step 712 did not succeed are marked as failed. After step 715, control is returned to step 702 to start process 700 again.

At 714, the parity information and the available data chunks are obtained from the host memory. The RAID controller then performs a DMA read over the bus to the host memory to obtain the available data chunks (a subset of the requested data chunks) and the associated parity information.

At 716, reconstructed data is generated based on the available data chunks and the parity information. The RAID controller uses the parity information and the available data chunks of the requested data chunks to reconstruct/generate the remaining data chunks that are stored on the failed storage devices.

At 718, the host memory is directly accessed to write the reconstructed data to the host memory. The RAID controller then writes the reconstructed data to the host memory over the (e.g., PCIe) bus using a DMA write. The available data chunks had also been written by the available storage devices to the host memory over the bus using DMA writes in response to the read commands that the RAID controller had sent to them at step 712.

At 720, a second set of read commands is sent to a set of redundant storage devices to cause the set of redundant storage devices to directly access the host memory to write a set of mirrored data chunks to the host memory. Where data redundancy was used by a configured RAID mode to store the unavailable data chunks, the redundant storage devices that had been used to store the unavailable data chunks but had not been sent read commands by the RAID controller at step 712 are sent read commands. In response to the read commands, the redundant storage devices are configured to write the requested data chunks (that had been stored on the failed storage devices that were initially queried) to the host memory using DMA writes over the bus.

At 724, it is determined whether all of the read commands sent at either step 706 or step 720 are successful. In the event that all of the read commands sent at either step 706 or step 720 are successful, control is transferred to 726. Otherwise, in the event that at least one of the read commands sent at either step 706 or step 720 is not successful, control is transferred to 728. For example, a read command is determined to succeed if it can be completed by the corresponding storage device. Also, for example, a read command is determined to fail if the corresponding storage device cannot complete the read command and/or sends a failure message back to the RAID controller.

At 726, a success message is sent to the requestor of the read request. Step 726 is reached after one of three possible scenarios as described above: 1) none of the storage devices that are relevant to the read request have failed and the storage devices have successfully completed read commands sent to them, 2) at least one of the storage devices that are relevant to the read request has failed but reconstruction of the requested data was successful using the stored parity information, and 3) at least one of the storage devices that are relevant to the read request has failed but the missing data chunks (that were stored on the failed storage device(s)) were successfully obtained from the redundant storage devices.

At 728, the storage device(s) at which read commands sent at step 720 did not succeed are marked as failed. After step 728, control is returned to step 702 to start process 700 again.

At 722, an error message is sent to the requestor of the read request. If neither reconstruction nor data redundancy are available, then the read request has failed. To indicate that the read request has failed, for example, an entry indicating an error code in its status field is added to a completion queue associated with the RAID controller (which is emulating a NVMe device).

As shown in the example process of process 700, a read request from the host can still be completed in a way where the RAID controller is removed from the data path such that the storage devices can directly write the requested data to the host memory. The storage devices can directly write the requested data to the host memory (as opposed to store the requested data onto the RAID controller and have the RAID controller serve as an intermediary that then returns the data to the host) either in the event that none of the storage devices relevant to the read request have failed or in the event that at least one relevant storage device has failed but that the data stored on the failed storage device(s) has been redundantly stored on other storage devices that are part of the RAID group.

Figure 8:
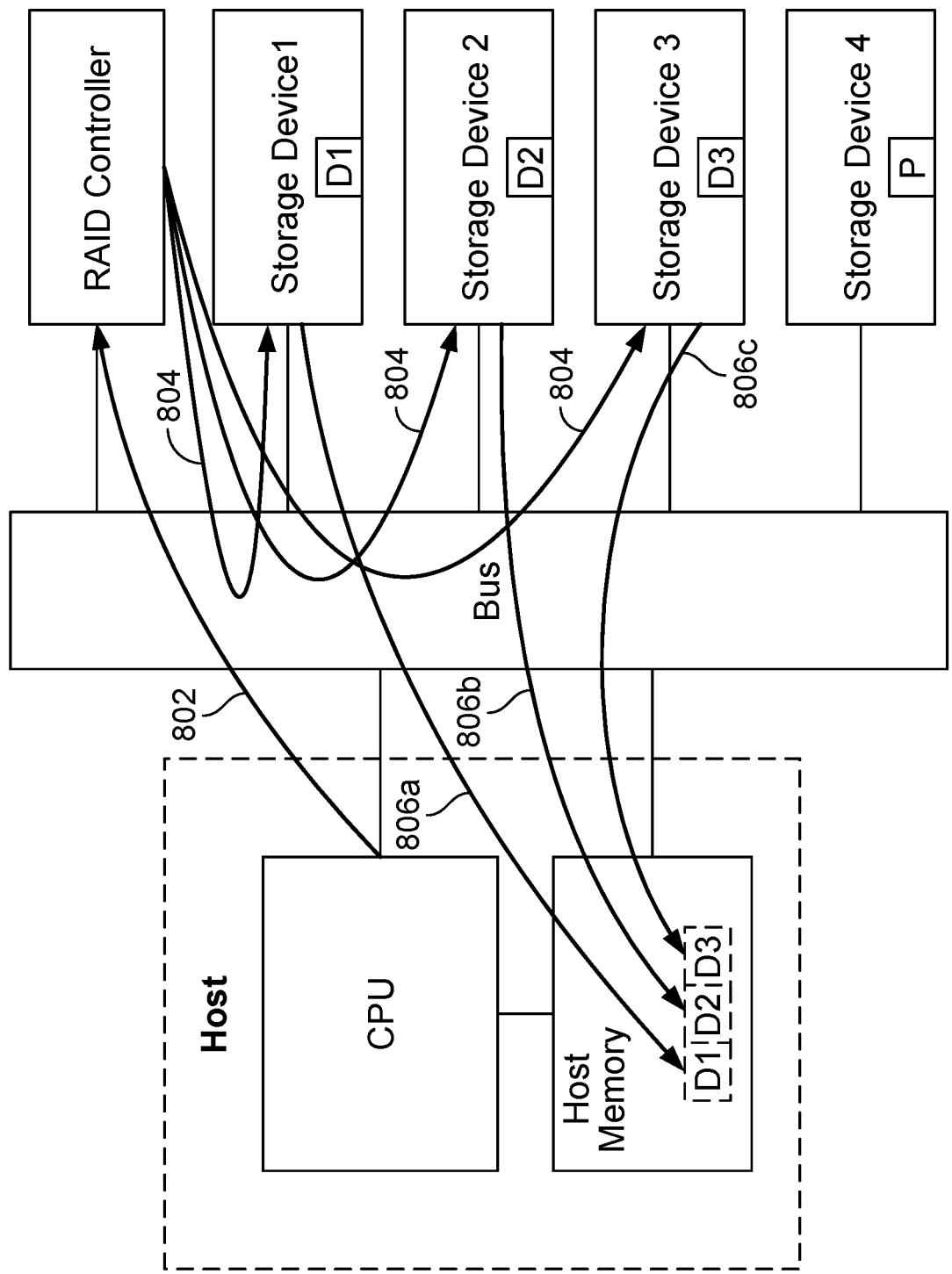
FIG. 8 shows an example process of completing a read request, received from a host, across a RAID group of storage devices.

FIG. 8 shows an example process of completing a read request, received from a host, across a RAID group of storage devices. FIG. 8 shows an example process of completing a read request of data that is written to a set of available (not failed) storage devices, meaning that neither parity information is needed to perform reconstruction nor a mirrored/redundant storage device is needed to be queried.

At 802, the CPU of the host sends a read request to the RAID controller and where the read request requests the RAID controller to read data chunks D1, D2, and D3 (at their specified addresses). In response to receiving the read request, the RAID controller is configured to determine that data chunks D1, D2, and D3 are stored respectively at Storage Device 1, Storage Device 2, and Storage Device 3. At 804, the RAID controller is then configured to send respective read commands to Storage Device 1, Storage Device 2, and Storage Device 3. The respective read commands sent by the RAID controller to Storage Device 1, Storage Device 2, and Storage Device 3 include respective designated locations at the host memory associated with the CPU at which Storage Device 1, Storage Device 2, and Storage Device 3 are to write data chunks D1, D2, and D3. At steps 806a, 806b, and 806c, Storage Device 1, Storage Device 2, and Storage Device 3 are then configured to locally read data chunks D1, D2, and D3 and then perform DMA write operations over the (e.g., PCIe) bus to respectively write data chunks D1, D2, and D3 to the designated locations within the host memory. For example, the designated locations at which the requested data chunks are to be written to the host memory associated with the CPU can be prescribed within the read request from the CPU to the RAID controller. Given that in the specific example described in FIG. 8, all three storage devices Storage Device 1, Storage Device 2, and Storage Device 3 to which the RAID controller had sent read commands are available (not failed), the parity information that had been computed based on data chunks D1, D2, and D3 and that was stored on Storage Device 4 (e.g., using a process such as the example process described with FIGS. 5A and 5B described above) did not need to be obtained by the RAID controller and used to reconstruct a missing/unavailable data chunk. As such, as shown in the example of FIG. 8, where the storage devices involved to complete a read request from a CPU are healthy/available (not failed), then the RAID controller is also removed from the data path of the storage devices writing the requested data to the host memory (e.g., as described in process 700 of FIG. 7) to enable a more efficient read data path.

Figure 9:
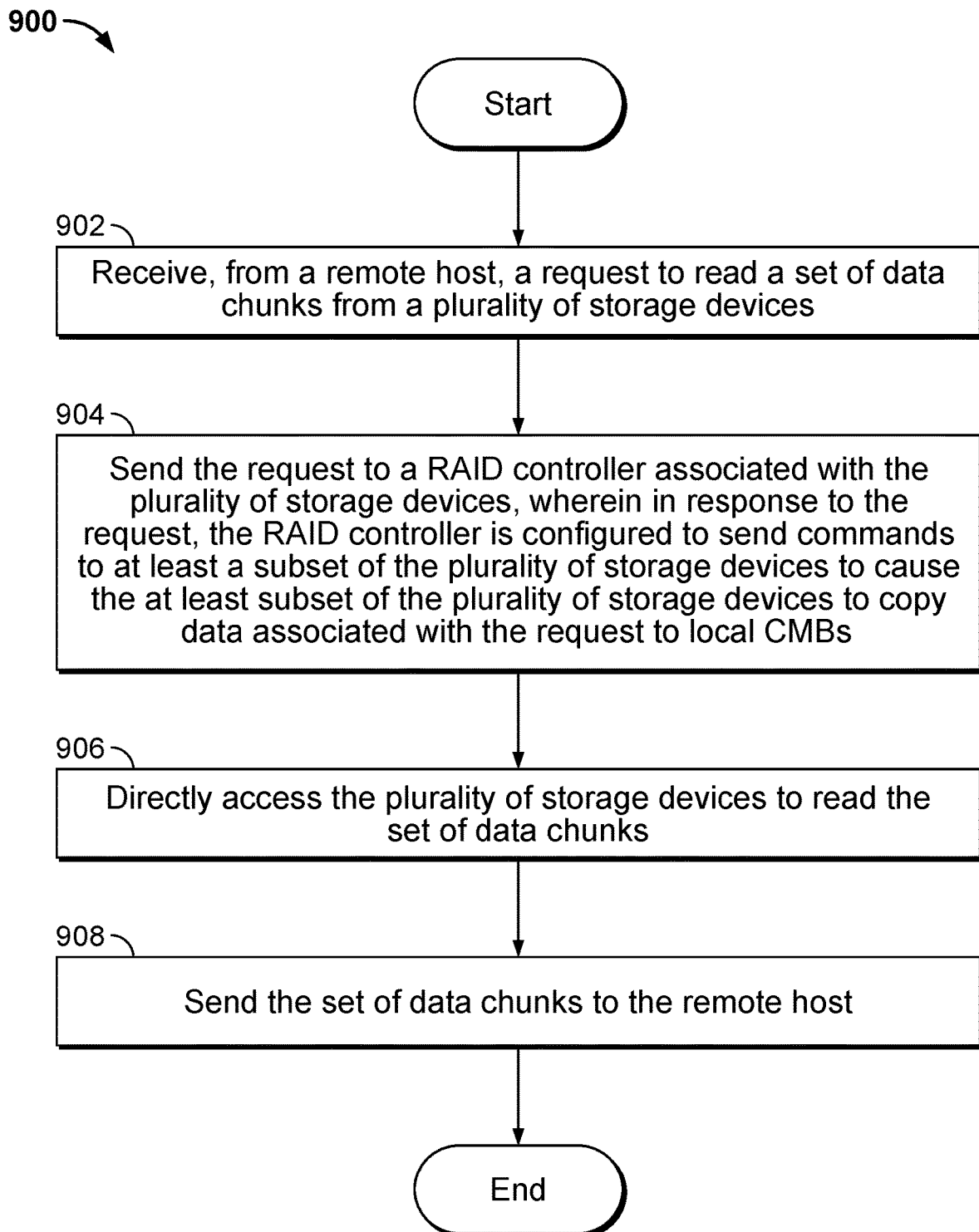
FIG. 9 is a flow diagram showing an example of a process for processing a read request to a plurality of storage devices and where the read request is received from a host that is remote to the plurality of storage devices.

FIG. 9 is a flow diagram showing an example of a process for processing a read request to a plurality of storage devices and where the read request is received from a host that is remote to the plurality of storage devices. In some embodiments, process 900 is implemented by RNIC 222 of FIG. 2.

At 902, a request to read a set of data chunks from a plurality of storage devices is received from a remote host. The host is "remote" to the plurality of storage devices that is associated with a RAID group. For example, the host can be remote to the plurality of storage devices by being separated from the plurality of storage devices by a network, such as remote host 218 as shown in FIG. 2. The read request from the remote host is received over a network by an RNIC that is local to the storage devices. For example, the RNIC is local to the storage devices in that the RNIC is not separate from the storage devices by a network and can instead directly access the storage devices over a (e.g., PCIe) bus.

At 904, the request is sent to a RAID controller associated with the plurality of storage devices, wherein in response to the request, the RAID controller is configured to send commands to at least a subset of the plurality of storage devices to cause the at least subset of the plurality of storage devices to copy data associated with the request to their local CMBs. The RNIC then forwards the read request to the RAID controller. The RAID controller then issues commands to the storage devices (which have already enabled the CMB feature) on which the requested data is stored and such storage devices are configured to copy the requested data chunks from their permanent storage media to their local CMBs. After the RAID controller sends the commands to the storage devices, the RAID controller replies to the RNIC with the CMB locations of the storage devices.

At 906, the plurality of storage devices is directly accessed to read the set of data chunks. Because the CMB feature of the NVMe protocol enables a portion of storage devices' memories to be exposed to the RNIC, the RNIC can perform DMA read operations over the bus to the storage device(s) to their respective CMB locations to obtain the requested data chunks.

At 908, the set of data chunks is sent to the remote host. The data chunks that have been read by the RNIC are then sent back to the remote host over the network.

Figure 10:
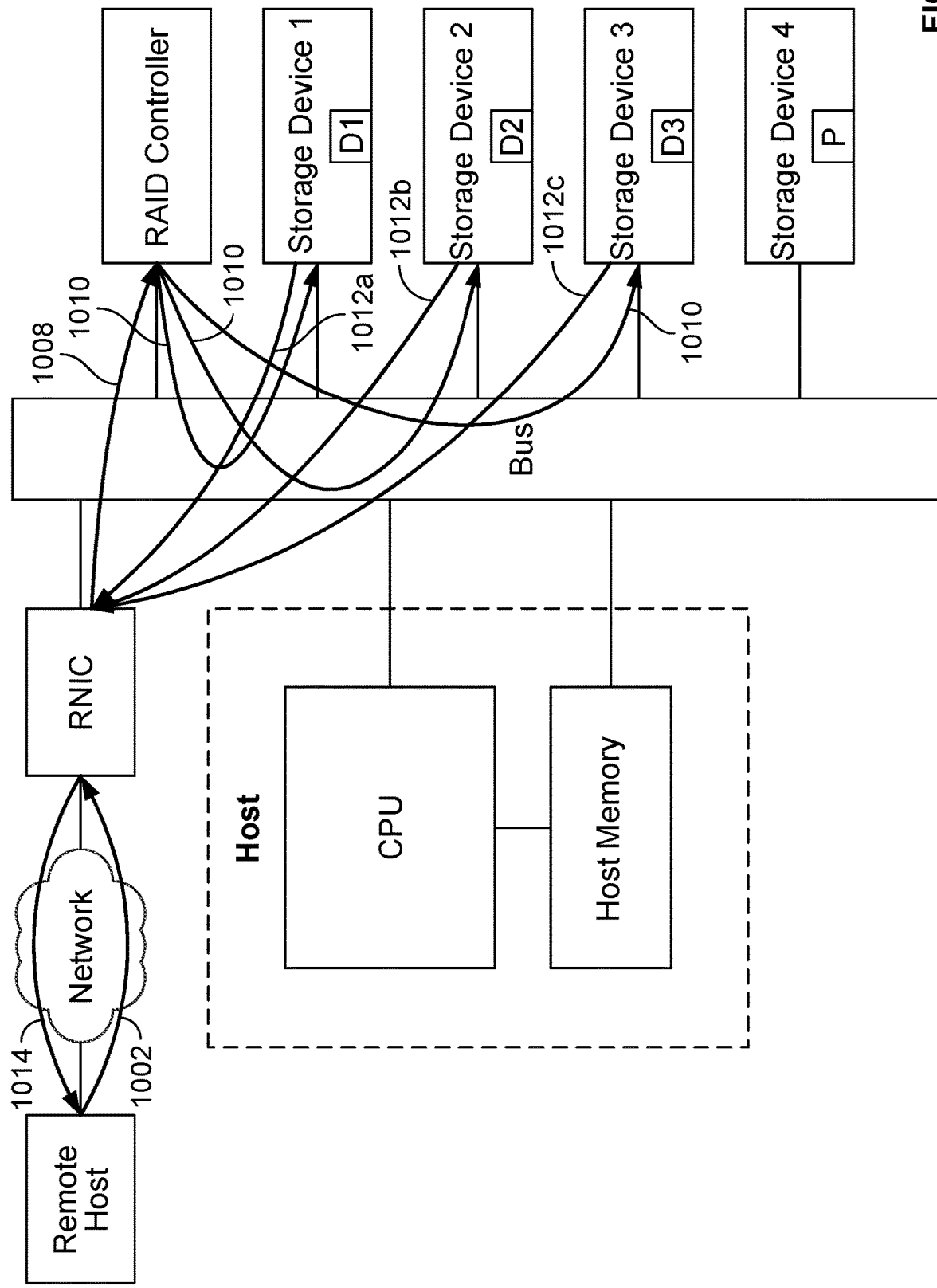
FIG. 10 shows an example process of completing a read request, received from a remote host, across a RAID group of storage devices.

FIG. 10 shows an example process of completing a read request, received from a remote host, across a RAID group of storage devices. FIG. 10 shows an example process of completing a read request of data from a set of available (not failed) storage devices, meaning that neither is parity information needed to perform reconstruction nor is a mirrored/redundant storage device needed to be queried.

The RNIC of FIG. 2 is local to Storage Devices 1, 2, 3, and 4, which have stored data based on the instruction of the RAID controller. Each of Storage Devices 1, 2, 3, and 4 have been configured with the CMB feature of the NVMe protocol, which enables at least a portion of the memories of Storage Devices 1, 2, 3, and 4 to be exposed (e.g., directly accessible) by the RNIC. In contrast to the local host, whose CPU can communicate with the RAID controller to perform read and write requests, a remote host must send read and write requests to the RNIC over the network. In the example of FIG. 10, at 1002, the remote host sends a read request to the RNIC over the network. The read request requests to read data chunks D1, D2, and D3 at specified addresses. In response to receiving the read request, at 1008, the RNIC is configured to send the read request to the RAID controller. At 1010, the RAID controller then issues read commands to Storage Device 1, Storage Device 2, and Storage Device 3 to instruct Storage Device 1, Storage Device 2, and Storage Device 3 to copy the to-be-read data to each of their respective CMBs. After the RAID controller sends the read commands to Storage Device 1, Storage Device 2, and Storage Device 3, the RAID controller than replies to the RNIC with the CMB locations on each of Storage Device 1, Storage Device 2, and Storage Device 3 at which the requested data chunks D1, D2, and D3 are stored. Then, at 1012*a*, 1012*b*, and 1012*c*, the RNIC performs DMA reads to the CMB locations of Storage Device 1, Storage Device 2, and Storage Device 3 over the bus to obtain the requested data chunks D1, D2, and D3. At 1014, the RNIC then sends data chunks D1, D2, and D3 back to the remote host over the network. As such, as shown in the example of FIG. 10, where the storage devices involved to complete a read request from a remote host are healthy/available (not failed), then the RAID controller is also removed from the data path of the storage devices writing the requested data to the host memory (e.g., as described in process 900 of FIG. 9) to enable a more efficient read data path.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising;
a plurality of storage devices; and
a Redundant Array of Independent Disks (RAID) controller configured to:
receive a request to read data distributed among the plurality of storage devices;
identify a first subset of the plurality of storage devices to which data associated with the request was written based at least in part on a RAID mode implemented by the RAID controller;
cause the first subset of the plurality of storage devices to:
locally read the data associated with the request from the first subset of the plurality of storage devices; and
directly write the read data associated with the request to a memory that is remote to the RAID controller;
determine that a storage device in the first subset of the plurality of storage devices has become unavailable based on;
sending a read command to the storage device in the first subset of the plurality of storage devices, wherein the read command includes a respective designated location at the memory that is remote to the RAID controller at which the storage device is to write read data, wherein the respective designated location was prescribed within the request to read data that was received by the RAID controller; and
capturing a direct memory access (DMA) error from polling a completion queue associated with the storage device;
identify a second subset of the plurality of storage devices to which parity information was written based at least in part on the RAID mode; and
cause the second subset of the plurality of storage devices to:
locally read the parity information; and
directly write the parity information to the memory that is remote to the RAID controller.

2. The system of claim 1, wherein the RAID controller is implemented using a graphics processing unit (GPU).

3. The system of claim 1, wherein the request is received from a central processing unit (CPU) associated with a host and where the memory that is remote to the RAID controller is a host memory associated with the CPU.

4. The system of claim 1, wherein to cause the first subset of the plurality of storage devices to directly write the data associated with the request to the memory that is remote to the RAID controller comprises to send read commands to the first subset of the plurality of storage devices.

5. The system of claim 1, wherein to directly write the read data associated with the request to the memory that is remote to the RAID controller comprises to use direct memory (DMA) to write the read data at the respective designated location at the memory that is determined from the request.

6. The system of claim 1, wherein the RAID controller is further configured to:
    read the parity information and the read data associated with the request from the memory that is remote to the RAID controller;
    generate reconstructed data based on the parity information and the read data associated with the request; and
    write the reconstructed data to the memory that is remote to the RAID controller.

7. The system of claim 1, wherein the request comprises a first request, and further comprising:
    an RDMA network interface card (RNIC) configured to:
        receive a second request, from a remote host, to read data from the plurality of storage devices;
        send the second request to the RAID controller, wherein in response to the second request, the RAID controller is further configured to send commands to a third subset of the plurality of storage devices to cause the third subset of the plurality of storage devices to copy data associated with the second request to their local controller memory buffers (CMBs);
        directly access the third subset of the plurality of storage devices to read the data associated with the second request; and
        send the data associated with the second request to the remote host.

8. A method, comprising:
    receiving, at a Redundant Array of Independent Disks (RAID) controller, a request to read data distributed among a plurality of storage devices;
    identifying a first subset of the plurality of storage devices to which data associated with the request was written based at least in part on a RAID mode implemented by the RAID controller;
    causing the first subset of the plurality of storage devices to:
        locally read the data associated with the request from the first subset of the plurality of storage devices; and
        directly write the read data associated with the request to a memory that is remote to the RAID controller;
    determining that a storage device in the first subset of the plurality of storage devices has become unavailable based on:
        sending a read command to the storage device in the first subset of the plurality of storage devices, wherein the read command includes a respective designated location at the memory that is remote to the RAID controller at which the storage device is to write read data, wherein the respective designated location was prescribed within the request to read data that was received by the RAID controller; and
        capturing a direct memory access (DMA) error from polling a completion queue associated with the storage device;
    identifying a second subset of the plurality of storage devices to which parity information was written based at least in part on the RAID mode; and
    causing the second subset of the plurality of storage devices to:
        locally read the parity information; and
        directly write the parity information to the memory that is remote to the RAID controller.

9. The method of claim 8, wherein the RAID controller is implemented using a graphics processing unit (GPU).

10. The method of claim 8, wherein the request is received from a central processing unit (CPU) associated with a host and where the memory that is remote to the RAID controller is a host memory associated with the CPU.

11. The method of claim 8, wherein causing the first subset of the plurality of storage devices to directly write the data associated with the request to the memory that is remote to the RAID controller comprises sending read commands to the first subset of the plurality of storage devices.

12. The method of claim 8, wherein to directly write the read data associated with the request to the memory that is remote to the RAID controller comprises to use direct memory (DMA) to write the read data at the respective designated location at the memory that is determined from the request.

13. The method of claim 8, further comprising:
    reading the parity information and the read data associated with the request from the memory that is remote to the RAID controller;
    generating reconstructed data based on the parity information and the read data associated with the request; and
    writing the reconstructed data to the memory that is remote to the RAID controller.

14. The method of claim 8, wherein the request comprises a first request, and further comprising:
    receiving, at an RDMA network interface card (RNIC), a second request, from a remote host, to read data from the plurality of storage devices;
    sending, from the RNIC, the second request to the RAID controller, wherein in response to the second request, the RAID controller is further configured to send commands to a third subset of the plurality of storage devices to cause the third subset of the plurality of storage devices to copy data associated with the second request to their local controller memory buffers (CMBs);
    directly accessing, by the RNIC, the third subset of the plurality of storage devices to read the data associated with the second request; and
    sending, from the RNIC, the data associated with the second request to the remote host.

* * * * *